(12) United States Patent
McLean

(10) Patent No.: US 9,501,805 B2
(45) Date of Patent: Nov. 22, 2016

(54) METHODS AND SYSTEMS FOR OPTIMIZING A BUILDING DESIGN

(71) Applicant: INTEGRATED ENVIRONMENTAL SOLUTIONS, LTD., Boston, MA (US)

(72) Inventor: Donald John McLean, Bearsden (GB)

(73) Assignee: INTEGRATED ENVIORNMENTALSOLUTIONS, LTD., Boston, MA (US)

( * ) Notice: Subject to any disclaimer, the term of this patent is extended or adjusted under 35 U.S.C. 154(b) by 0 days.

(21) Appl. No.: 13/958,279

(22) Filed: Aug. 2, 2013

(65) Prior Publication Data

US 2014/0039832 A1    Feb. 6, 2014

Related U.S. Application Data

(63) Continuation of application No. 12/770,232, filed on Apr. 29, 2010, now Pat. No. 8,532,835.

(60) Provisional application No. 61/174,365, filed on Apr. 30, 2009, provisional application No. 61/186,145, filed on Jun. 11, 2009.

(51) Int. Cl.
*G06Q 50/06* (2012.01)
*G06Q 10/06* (2012.01)
*G06Q 10/10* (2012.01)

(52) U.S. Cl.
CPC ............. *G06Q 50/06* (2013.01); *G06Q 10/06* (2013.01); *G06Q 10/103* (2013.01)

(58) Field of Classification Search
CPC ..................................... G06Q 50/06
USPC .......................................... 702/182; 700/291
See application file for complete search history.

(56) References Cited

U.S. PATENT DOCUMENTS

| | | |
|---|---|---|
| 5,937,941 A | 8/1999 | Gach |
| 5,971,597 A | 10/1999 | Baldwin et al. |
| 5,983,010 A | 11/1999 | Murdock et al. |
| 6,028,998 A | 2/2000 | Gloudeman et al. |
| 6,064,310 A | 5/2000 | Busak et al. |
| 6,119,125 A | 9/2000 | Gloudeman et al. |
| 6,216,956 B1 * | 4/2001 | Ehlers et al. ................... 236/47 |
| 6,263,260 B1 | 7/2001 | Bodmer et al. |
| 6,941,193 B2 | 9/2005 | Frecska et al. |
| 6,990,821 B2 | 1/2006 | Singh et al. |
| 7,243,044 B2 | 7/2007 | McCalla |

(Continued)

FOREIGN PATENT DOCUMENTS

| | | |
|---|---|---|
| EP | 1 850 440 | 10/2007 |
| JP | 2003-074943 | 3/2003 |
| WO | WO 97/44720 | 11/1997 |

OTHER PUBLICATIONS

Olesen et al., "A Better Way to Predict Comfort" pp. 20-26, ASHRAE Journal, Aug. 2004.*

(Continued)

*Primary Examiner* — Tejal Gami
(74) *Attorney, Agent, or Firm* — DLA Piper LLP (US)

(57) ABSTRACT

Methods and systems for optimizing a building design. A geographic location and a human comfort zone are identified. It is determined whether to adjust the building design based on information comprising building simulated delivered energy data and whether the building design meets pre-determined comfort conditions.

18 Claims, 17 Drawing Sheets

(56) References Cited

U.S. PATENT DOCUMENTS

| | | |
|---|---|---|
| 7,392,661 B2 | 7/2008 | Alles |
| 7,426,454 B2 | 9/2008 | Mertins et al. |
| 7,502,768 B2 | 3/2009 | Ahmed et al. |
| 7,665,670 B2 | 2/2010 | Ahmed |
| 7,719,440 B2 | 5/2010 | Delp et al. |
| 7,774,245 B2 | 8/2010 | Voysey |
| 7,778,734 B2 | 8/2010 | Oswald et al. |
| 7,797,084 B2 | 9/2010 | Miwa |
| 7,912,807 B2 | 3/2011 | McLean et al. |
| 2003/0009507 A1 | 1/2003 | Shum |
| 2004/0239494 A1 | 12/2004 | Kennedy et al. |
| 2005/0010365 A1 | 1/2005 | Chapman et al. |
| 2005/0137921 A1 | 6/2005 | Shahriari |
| 2006/0195817 A1 | 8/2006 | Moon |
| 2007/0005191 A1 | 1/2007 | Sloup et al. |
| 2007/0282576 A1 | 12/2007 | Butine |
| 2008/0015823 A1 | 1/2008 | Arnold et al. |
| 2008/0033777 A1 | 2/2008 | Shukoor |
| 2008/0092108 A1 | 4/2008 | Corral |
| 2008/0177423 A1 | 7/2008 | Brickfield et al. |
| 2009/0088991 A1 | 4/2009 | Brzezowski et al. |
| 2009/0094557 A1 | 4/2009 | Howard |
| 2009/0210192 A1 | 8/2009 | Askar |
| 2009/0228406 A1 | 9/2009 | Lopez et al. |
| 2009/0271154 A1* | 10/2009 | Coad et al. ............ 703/1 |
| 2009/0299813 A1 | 12/2009 | Cody et al. |
| 2010/0017177 A1 | 1/2010 | Dosunmu |
| 2010/0100405 A1 | 4/2010 | Lepore et al. |
| 2010/0106674 A1 | 4/2010 | McLean et al. |
| 2010/0118026 A1 | 5/2010 | Demchak et al. |
| 2010/0211222 A1 | 8/2010 | Ghosn |
| 2010/0211224 A1 | 8/2010 | Keeling et al. |
| 2010/0223081 A1 | 9/2010 | Espino, Jr. |
| 2010/0235206 A1 | 9/2010 | Miller et al. |
| 2010/0286937 A1 | 11/2010 | Hedley et al. |
| 2010/0332044 A1 | 12/2010 | McLean |
| 2012/0016638 A1 | 1/2012 | McLean et al. |
| 2012/0271784 A1 | 10/2012 | McLean et al. |

OTHER PUBLICATIONS

Brager et al., "Climate, Comfort, & Natural Ventilation: A new adaptive comfort standard for ASHRAE Standard 55" pp. 1-18, University of California, Berkeley, 2001.*

Michael Utzinger et al., "Vital Signs: Building Balance Point", http://arch.ced.berkeley.edu/vitalsigns/res/downloads/rp/balance_point/balance_point_big.pdf, 99 pages (Aug. 1997).
"http://www.trnsys.com/", retrieved from Internet Archive, archived Jul. 25, 2008 (72 pages).
"http://www.energysoft.com/", retrieved from Internet Archive, archived Mar. 9, 2008 (24 pages).
"http://www.doe2.com/", retrieved from Internet Archive, archived Mar. 20, 2006 (5 pages).
"http://www.designbuilder.co.uk/", retrieved from Internet Archive, archived Jul. 6, 2008 (68 pages).
"http://www.edsl.net/", retrieved from Internet Archive, archived Jul. 12, 2008 (2 pages).
"http://www.bentley.com/", retrieved from Internet Archive, archived Jun. 5, 2008 (6 pages).
"http://www.energy.gov/", retrieved from Internet Archive, archived Jul. 30, 2008 (2 pages).
"http://www.usa.autodesk.com/", printed Nov. 1, 2010 (17 pages).
International Search Report issued in PCT/US2010/032947 on Nov. 30, 2010.
Written Opinion issued in PCT/US2010/032947 on Nov. 30, 2010.
International Search Report issued in PCT/US2010/032955 on Nov. 29, 2010.
Written Opinion issued in PCT/US2010/032955 on Nov. 29, 2010.
English Abstract of JP 2003-074943 published Mar. 12, 2003.
English Translation of JP 2003-074943 published Mar. 12, 2003.
Manuel Ibanez et al., "An Approach to the Simulation of PCMs in Building Applications Using TRNSYS", Applied Thermal Engineering, vol. 25, pp. 1796-1807 (2005).
Jeong Han Woo, "BIM (Building Information Modeling) and Pedagogical Challenges", Proceeding of the 43rd ASC National Annual Conference, pp. 1-11 (2006).
J. Lucas et al., "Analyzing Capacity of BIM Tools to Support Data Use Across Project Lifecycle", Managing it in Construction/Managing Construction for Tomorrow, vol. 26, CRC Press, Taylor & Francis Group, Istanbul, Turkey, pp. 1-9 (2009).
Jessica E. McFarland, Building Information Modeling for MEP, Kansas State University, pp. 1-52 (2007).
U.S. Appl. No. 12/770,232.
U.S. Appl. No. 12/461,557.
U.S. Appl. No. 13/029,826.
U.S. Appl. No. 13/440,786.
Office Action issued in GB 1120551.5 dated Aug. 20, 2015.
Office Action issued in GB 1120551.5 dated Mar. 11, 2016.
Office Action issued in GB 1120552.3 dated Aug. 20, 2015.
Office Action issued in GB 1120552.3 dated Mar. 11, 2016.

* cited by examiner

FIGURE 16

Calculate the PMV using Equations (1) to (4):

$$PMV = [0.303 \cdot \exp(-0.036 \cdot M) + 0.028] \cdot \left\{ \begin{array}{l} (M-W) - 3.05 \cdot 10^{-3} \cdot [5.733 - 6.99 \cdot (M-W) - p_a] - 0.42 \cdot [(M-W) - 58.15] \\ -1.7 \cdot 10^{-5} \cdot M \cdot (5.867 - p_a) - 0.0014 \cdot M \cdot (34 - t_a) \\ -3.96 \cdot 10^{-8} \cdot f_{cl} \cdot [(t_{cl} + 273)^4 - (\bar{t}_r + 273)^4] - f_{cl} \cdot h_c \cdot (t_{cl} - t_a) \end{array} \right\}$$

$$t_{cl} = 35.7 - 0.028 \cdot (M-W) - f_{cl} \cdot \{3.96 \cdot 10^{-8} \cdot f_{cl} [(t_{cl} + 273)^4 - (\bar{t}_r + 273)^4] + f_{cl} \cdot h_c \cdot (t_{cl} - t_a)\}$$

$$h_c = \begin{cases} 2.38 \cdot |t_{cl} - t_a|^{0.25} & \text{for } 2.38 \cdot |t_{cl} - t_a|^{0.25} > 12.1 \cdot \sqrt{v_{ar}} \\ 12.1 \cdot \sqrt{v_{ar}} & \text{for } 2.38 \cdot |t_{cl} - t_a|^{0.25} < 12.1 \cdot \sqrt{v_{ar}} \end{cases}$$

$$f_{cl} = \begin{cases} 1.00 + 1.290 I_{cl} & \text{for } I_{cl} < 0.078 \, m^2 \cdot K/W \\ 1.05 + 0.645 I_{cl} & \text{for } I_{cl} > 0.078 \, m^2 \cdot K/W \end{cases}$$

Where

- $M$ is the metabolic rate, in watts per square metre (W/m²);
- $W$ is the effective mechanical power, in watts per square metre (W/m²);
- $I_{cl}$ is the clothing insulation, in square metres kelvin per watt (m² · K/W);
- $f_{cl}$ is the clothing surface area factor;
- $t_a$ is the air temperature, in degrees Celsius (°C);
- $\bar{t}_r$ is the mean radiant temperature, in degrees Celsius (°C);
- $v_{ar}$ is the relative air velocity, in metres per second (m/s);
- $p_B$ is the water vapour partial pressure, in pascals (Pa);
- $h_c$ is the convective heat transfer coefficient, in watts per square metre kelvin [W/(m² · K)];
- $t_{cl}$ is the clothing surface temperature, in degrees Celsius (°C).

PRIOR ART

METHODS AND SYSTEMS FOR OPTIMIZING A BUILDING DESIGN

This application is a continuation of U.S. patent application Ser. No. 12/770,232, filed Apr. 29, 2010, which claims priority to U.S. Provisional Application 61/174,365 fled on Apr. 30, 2009 and U.S. Provisional Application 61/186,145 filed on Jun. 11, 2009. All of the foregoing are incorporated by reference in their entireties. In addition, the entire contents of U.S. application Ser. No. 12/461,557 are incorporated by reference.

BRIEF DESCRIPTION OF THE DRAWINGS

FIG. 16 is an example of a predicted mean vote (PMV) formula that can be used, according to one embodiment.

DETAILED DESCRIPTION OF SEVERAL EMBODIMENTS

Figure 1:
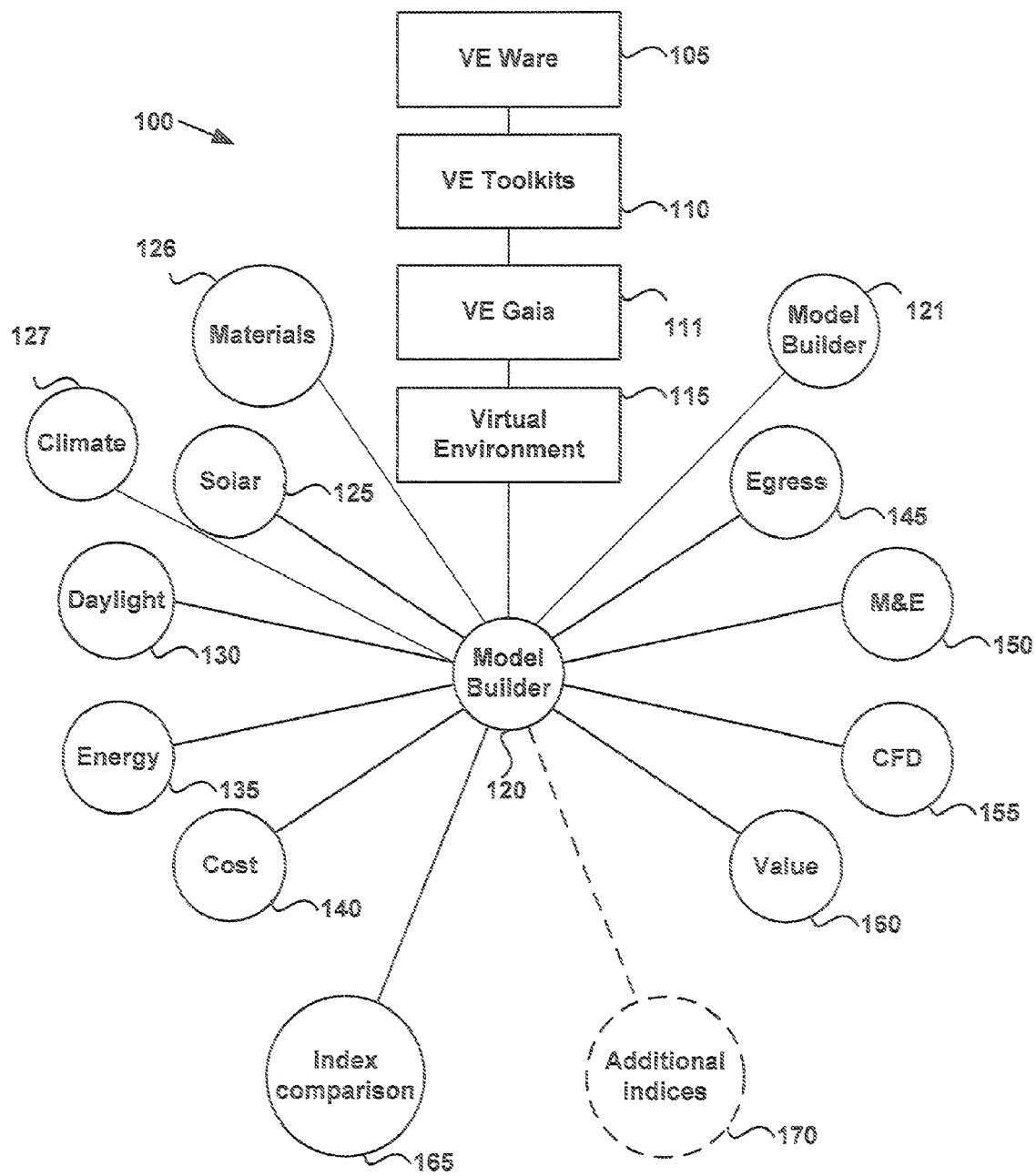
FIG. 1 is a high-level block diagram of an integrated analysis and design environment, according to an embodiment.

The present disclosure relates to generating and using indices. For example, a climate energy index and a building energy index can be generated, FIG. 1 is a high-level block diagram of an integrated analysis and design environment 100, according to an embodiment. The integrated analysis and design environment 100 is a virtual environment that includes a wide range of functional components that can share data via a shared data model 120. The integrated analysis and design environment 100 is a flexible, integrated system for building performance system assessment. It can enable comparison and evaluation of alternative design strategies, from concept to completion and beyond. The integrated and design environment can evaluate and help maximize the sustainable potential of a building throughout its lifecycle. The integrated analysis and design environment 100 can also interact intelligently with external software products (e.g., computer aided design (CAD), building information modeling (BIM)-importing geometry, and BIM data). For example, Autodesk REViT, Graphisoft ArchiCAD and Goode Sketchup models can be imported. The integrated analysis and design environment 100 can process the geometry to determine rooms in the Google Sketchup model.

The integrated analysis and design environment 100 can include, a model builder module 121, a solar module 125, a daylight module 130, an energy module 135, a cost module 140, an egress module 145, a mechanical and electrical design (M&E) module 150, a computational fluid dynamics (CFD) module 155, a value module 160, a climate module 127, and a materials module 126.

The model builder module 121 can be configured to construct detailed three-dimensional (3D) models, share data between applications or modules and/or import computer automated design (CAD) data from, for example, Sketchup, ArchiCAD and REViT, or by a green building extensible markup language/drawing exchange format (gbXML/DXF).

The solar module 125 can be configured to minimize or maximize the effect of solar gains, visualize the impact of a building around it and establish the implications of right-to-sunlight, generate supporting visual, graphical, and numerical data, and/or animate the movement of the sun through a building.

The egress module 145 can be configured to develop a design that: allows people to move freely throughout and avoid bottlenecks, evaluates alternative escape routes in the event of an emergency (e.g., a fire), and/or simulates and assesses different elevator or lift options.

The M&E module 150 can be configured to automate duct and/or pipe sizing, assess alternatives and make adjustments quickly and easily, and/or free up design time by automating the design of mechanical and electrical systems.

The CFD module 155 can be configured to simulate airflow, ensure optimum ventilation in a design, produce detailed comfort predictions for different areas of a room, assess strategies such as ventilated facades, for example, and/or visualize results and communicate such results with graphics.

The daylight module 130 can be configured to test the look and performance of different lighting designs, including: prediction of light levels, maximization of daylight, minimization of glare, visualize ambiance for different configurations, and Leadership in Energy and Environmental Design (LEED) daylight ratings.

The value module 160 can be configured to perform efficient and multidisciplinary value studies, including: providing a common interface to all those involved in a project, evaluating of a wide range of design parameters and comparing different options, and identifying best value solutions.

The cost module 140 can be configured to predict initial and lifecycle costs, including preparation of customized capital cost estimates and calculation the operating costs of a building throughout its lifetime.

The energy module 135 can be configured to maximize the potential of green strategies like natural ventilation, heat recovery, night cooling, heat pumps, and mixed mode systems, calculate heat loss and gains, thermal loads, and carbon emissions, simulate the impact of internal and external airflow, optimize artificial light control, model HVAC plant and control systems, assess feasibility and performance of renewables, comply with energy conservation legislation, and perform Architecture 2030 challenge benchmarking.

The materials module 126 can be configured to summarize the total materials data contained in the model, individually or by material group. The materials data may include weight, volume and other information related to material properties (e.g., data from the manufacturing, distribution and disposal of the material (e.g., embodied energy, embodied water, pollutants, byproducts or alternatives)). The materials data can be used for comparing options, optimizing design decisions, and reviewing lifecycle issues.

The climate module 127 can be configured to review, compare and analyze weather files (historical or synthetic or predicted) anywhere globally, produce metrics, trend data, and summarize results from such an analysis. The module can also be configured to set location and weather file information for the purposes of simulation within the VE.

The integrated analysis and design environment 100 can follow a simple shared process: geometry can be created, data can be assigned (e.g., BIM), and analysis can be carried out. For example, within the integrated analysis and design environment 100, a user may use model builder 121 to create geometry; Apache can then be used to add data (e.g., BIM), such as constructions and activities; and Suncast can then be used to analyze solar information. The Suncast results can also used to feed back as a precursor to Apache for thermal simulations. Data from Apache simulations can then provide the starting data for a CFD simulation (and so on). This can result in better productivity and holistic design.

The modules of the integrated analysis and design environment 100 can be accessed at several levels of user access suited to user ability and market deployment: virtual environment (VE) 115 can provide full access, VE Gaia 111 can provide detail access, VE Toolkit 110 can provide limited access; and VEWare 105 can provide minimal access (e.g., freeware). The integrated analysis and design environment 100 can also include an index comparison module 165 and additional indices module 170 that can connect to other modules via the shared model 120. The index comparison module 165 can be configured to generate, for example, a climate energy index and a building energy index, and/or to compare such indices with simulated or measured building energy consumption data. The additional indices module 170 can be configured to generate indices, for example, based on other aspects of climate, such as, but not limited to: wind, solar and water.

The climate energy index can be produced by the climate energy index module 175 (see FIG. 2) of the index comparison module 165 and can provide an indication of the consequence of climate with respect to building performance at an accepted standard of comfort at a particular geographic location. Thus, for example, the climate energy index can be based on a weather data file (e.g., relative humidity, temperature) and hours of use for a particular location. The climate energy index can operate at the air point and can exclude building thermal processes (e.g., gains, conduction, infiltration). The climate energy index can be used as a baseline indicator for purposes of comparing weather files, different climates (e.g., climate change data). The climate energy index can have multiple aspects and features that make it practical to building professionals. The climate energy index can be used as a simple (e.g., singular numeric) worldwide metric which can provide a uniform or standard worldwide perspective for building design purposes. By using the climate energy index in an expanded format (e.g., monthly and load type breakdown), the differences in climate by location can be included in design goals, strategies, and/or in the assessment of what is a successful design. The climate energy index can be used as an independent metric, and does not need to be tied to any country (e.g., national) requirements, location, standards, or method. The climate energy index can be solely based on climate data for a location and hours of use of a building, or particular spaces within the building being designed for that location.

Other aspects associated with the climate energy index include the use of predicted mean vote (PMV) as a basis for a defined comfort zone. Note that many other standards or methods can also be used as a basis for defining the comfort zone, including, but not limited to, Percent People Dissatisfied (PDD), adaptive comfort, and\or psychometric values such as temperature, relative humidity and moisture content. PMV is an index for defining the thermal sensation and the degree of discomfort (thermal dissatisfaction) experienced by people in moderate thermal environments. PDD can be derived from PMV and can indicate the percentage of thermally dissatisfied people who feel too cool or too warm. Adaptive comfort is an alternative to PMV; it can define a temperature envelope (i.e. an acceptable comfortable zone) that varies as the mean monthly external temperature outside varies. The PMV, PDD and adaptive comfort standards are described, for example, in more detail in International Standards Organization (ISO) 7730 (2005), ASHRAE 55 (2004), CIBSE Guide A (2006).

The climate energy index can be independent from building form, heating, ventilation, and/or what air-conditioning (HVAC) system is to be used. The climate energy index can be used to provide a clear understanding of the effects of climate and locality without requiring a building design.

The building energy index and the use of the index in relation to the building design process can be used to overcome limitations typically associated with manual attempts to produce an overall building design strategy performance indicator.

The building energy index, which can also be produced by the building energy index module 180 (see FIG. 2) of the index comparison module 165, can provide an index that can be used as a benchmark for direct comparison with simulated or measured building energy consumption. The building energy index can be derived from the climate energy index and benchmark data for non-climate based building energy uses (e.g., hot water, equipment loads, process loads, lighting loads or any other non space conditioning load). Thermal simulation output or measured data can produce annual energy figures for direct comparison with the building energy index For the comparison to be a valid or fair comparison with the building energy index, a number of checks may be carried out to ensure that an acceptable level of comfort is achieved in, for example, the proposed building design.

Figure 2:
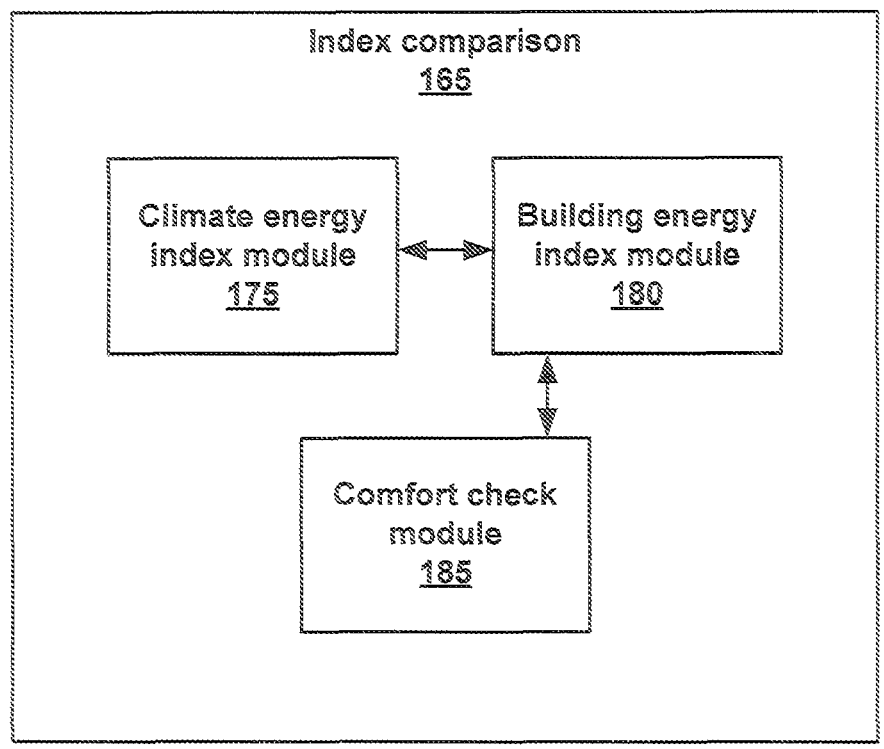
FIG. 2 is a block diagram of the index comparison module, according to an embodiment.

FIG. 2 is a block diagram of the index comparison module 165, according to an embodiment. The index comparison module 165 can include a climate energy index module 175, a building energy index module 180, and a comfort check module 185. The climate energy index module 175 is configured to determine the climate energy index for a particular geographic location based on multiple inputs such as weather data variables (e.g., temperature, relative humidity), occupancy times (e.g., building occupied during work hours), coefficients of performance (COP) (e.g., 0.9, 3.2), and/or model carbon factors. Carbon factors can be simple conversions from energy to carbon (e.g., kwh to kgCO2) that can vary depending on location and how local primary energy is produced (e.g., for electricity, energy may be produced by coal or gas fired power stations). Model carbon factors can be published by national governments and/or energy companies.

For a particular location and weather data file, the climate energy index can be given in units of Kwh/yr per ($m^3$/hr). For example, the climate energy index can range from about 12 Kwh/yr per ($m^3$/hr) in Los Angeles to about 95 Kwh/yr per ($m^3$/hr) in places such as Fairbanks, Ak. (These examples are given in units consistent with the International System of Units (SI); however, note that any measurement system can be used.) A more detailed description of the calculation of the climate energy index is provided below with respect to FIG. 7.

The building energy index module 180 can be configured to determine a building energy index for a particular building based on multiple inputs such energy data (e.g., climate energy index and non-space conditioning benchmark data as explained above). The non-space conditioning benchmark data can be normalized to reflect the same occupancy hours as the building being assessed so that the building energy index can be directly compared to the building simulated or measured data.

The comfort check module 185 can determine whether the building simulation results of a particular building meets certain check limits that ensure an acceptable level of comfort. The comfort check module 185 can be used to report whether certain spaces in the building, or whether the entire building, are deemed to have an acceptable level of comfort or not by determining to what extent such spaces, or building, fail annual percentage check limits. For example, comfort checks may result in the percentage of floor space in the building that is within the check limits to determine whether the building design fails the checks, meets the checks with a warning, or meets the checks without a warning. A more detailed description of the comfort check calculations is provided below with respect to FIG. 6.

Figure 3:
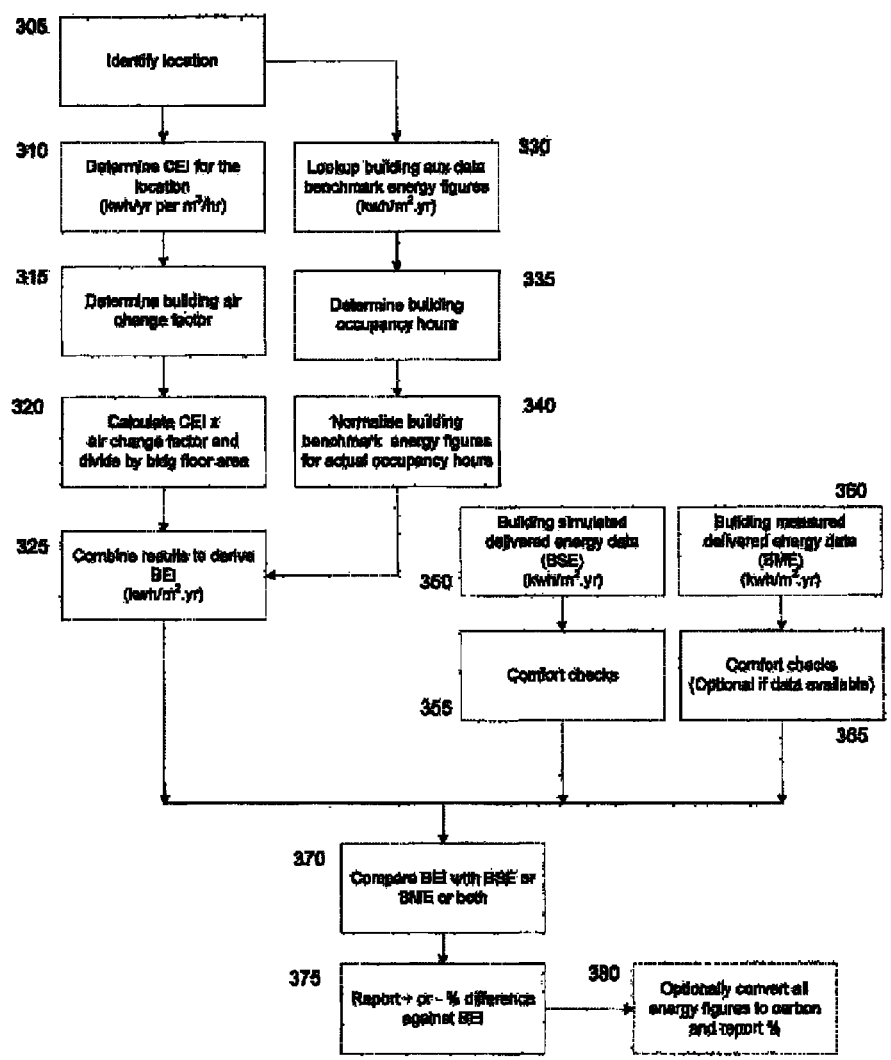
FIG. 3 is a high-level flow diagram illustrating the use of the index comparison module, according to an embodiment.

FIG. 3 is a high-level flow diagram illustrating the use of the climate energy index and the building energy index, according to an embodiment. At 305, a particular geographic location of interest is identified for analysis. For example, the city of Boston can be chosen. At 310, the climate energy index for that location is determined by the climate energy index module 175. The climate energy index can be determined by using standard weather data files associated with such a location. For example, the following standard weather files can be used: EnergyPlus Weather (EPW), FacetWin Terminal (FWT). It is also possible to convert other formats to these formats using $3^{rd}$ party products. For example, for the city of Boston, the climate energy index can be determined to be about 42 (see FIG. 9) Kwh/yr per ($m^3$/hr) for a 24-hour schedule occupancy schedule.

In 315, the building air change factor can be determined. In 320, the climate energy index multiplied by the air change factor divided by the floor area can be calculated. In 330, the building auxiliary data benchmark energy figures can be found (e.g., by looking up this information). The auxiliary data (also called non-space conditioning benchmark load data) can include any non-climate based building energy uses (e.g., hot water, equipment loads, process loads, lighting loads, any non-space conditioning load). (Note that this type of data will be referred to hereafter as auxiliary data.) In 335, the building occupancy hours can be determined. In 340, the building benchmark energy figures can be normalized for the actual occupancy hours in the target building. In 325, the results from 305-340 can be taken into account to derive the building energy index.

For example, for Boston, the CEI could be 42 kwh/yr per (m3/h). An example office building in this location may have an air change factor (315) of 7500 and a floor area of 2000 m2. Auxiliary benchmark data for this building type could be 82 kwh/m2·yr (330) based upon 2000 hours/yr. The building could be used for 2200 hours/yr (335); thus the normalized benchmark data (340) would be 82×2200/2000=90.2 kwh/m2·yr. The CEI multiplied by air change factor and divided by floor area would be 157.5 kwh/m2·yr (320). The combined result (325) would be 157.5+90.2=247.7 kwh/m2·yr In 350, a model simulation can be done to produce simulated data. In 355, comfort checks can be done. Similarly, in 360, measured building data can be collected. In 365, comfort checks can be done. In 370, the building energy index benchmark from 325 can be compared with the building simulated delivered energy data (from 355) and/or the building, measured delivered energy data (from 365). In 375, the difference between the building energy index benchmark and the building simulated delivered energy data and/or the building measured delivered energy data can be found and/or reported. In the above example, if the simulated building result was 302.5 kwh/m2·yr (350), and the building model simulation passed the comfort checks (355), the building model simulation is +22% higher when compared with the BEI (375).

In some embodiments, some or all of the data discussed above can be converted to carbon (380) using local carbon factors and can, in some embodiments, be reported.

Figure 4:
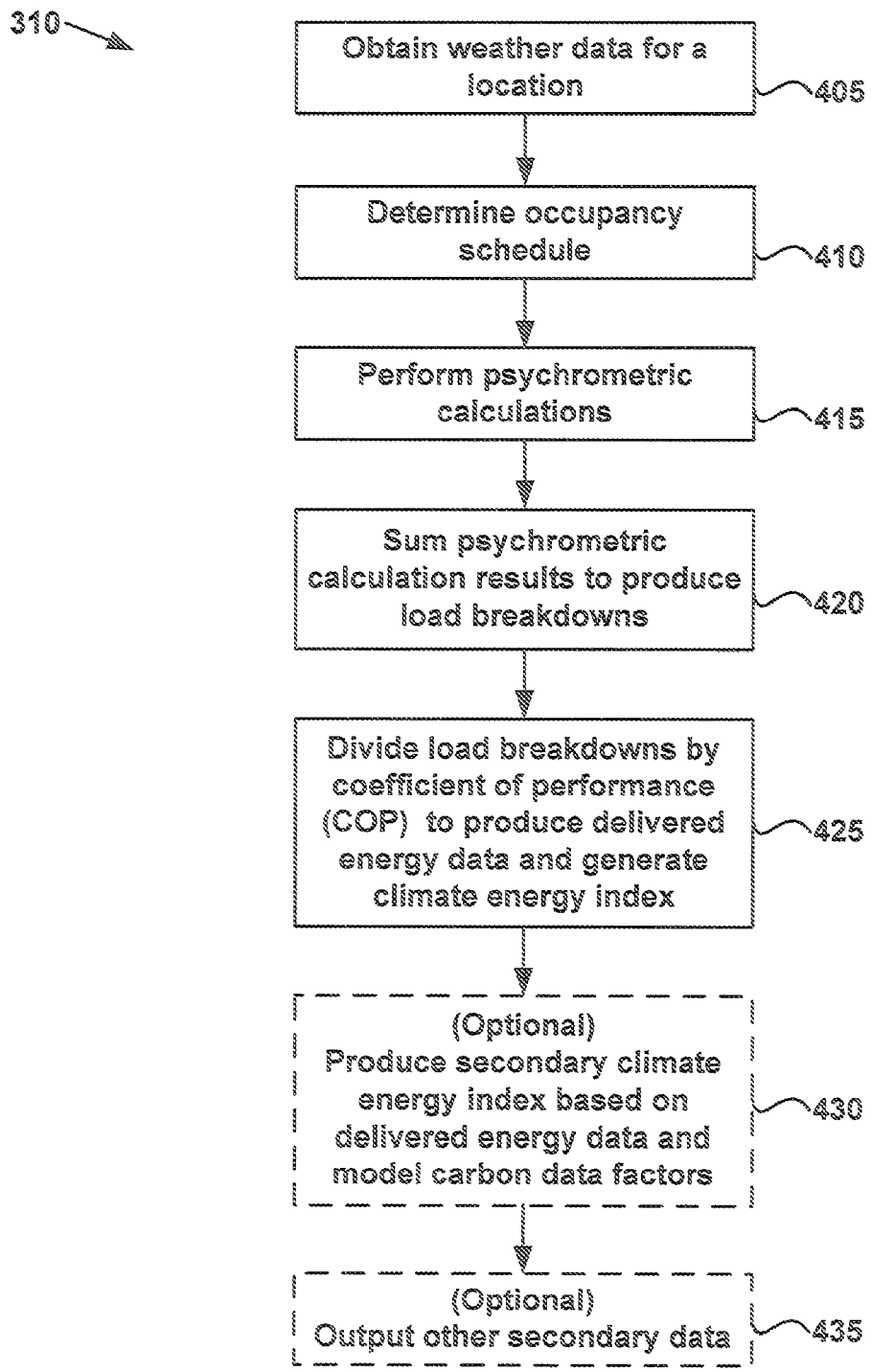
FIG. 4 is a flow diagram for determining the climate energy index, according to an embodiment.

FIG. 4 is a flow diagram for determining the climate energy index 310, according to an embodiment. At 405, weather data can be obtained for the geographic location of interest. The weather data can include dry bulb data (i.e., data associated with the temperature of air and measured using a dry bulb thermometer) and/or wet bulb data (i.e., data associated with the temperature of air and measured using a wet bulb thermometer). The weather data can be included in a weather data file having multiple weather ordinates (e.g., hourly readings). The weather data can include air point information such as air temperature and/or air moisture (e.g., relative humidity (RH), moisture content (MC)). For example, the weather data associated with a summer weather ordinate for the city of Boston can be dry bulb of 29° C. and wet bulb of 26° C. (RH=79% and MC=0.020 kg/kg). The weather data in the weather data file can be measured data or can be synthesized data (e.g., produced from data associated with a nearby location or a climate change scenario).

At 410, an occupancy rate or schedule can be produced or determined associated with the location. The occupancy schedule includes information associated with the level of occupancy of a building or other structure to be placed in the location of interest. In the Boston example, the occupancy of the building can be deemed to be OFF for a particular period of time (e.g., from 8:00 PM until 8:00 AM), when the occupancy is less than 10% the maximum occupancy of the site. In some instances (e.g., when comparing just weather files or locations), the climate energy index can be computed based on the simplified assumption that the occupancy of the building is deemed to be ON at all times.

At 415, for an instance in which the occupancy is deemed to be ON, a psychometric calculation is performed for each weather ordinate in the weather data file. A psychometric calculation provides an indication of the amount of energy that is required to bring or move an outside air point to a point on the boundary of the defined comfort zone. The calculations can be performed for each energy load type that can be used to reach the desired comfort point, such as cooling energy, heating energy, humidification energy, and dehumidification energy. The units of the psychometric calculation results in International System of Units (SI) can be typically given in kWh/yr per ($m^3$/hr). The psychometric calculation results can also be obtained in non-SI equivalent units. For the Boston example, the climate energy index that results from the psychometric calculations can be 14.61 Kwh/yr per ($m^3$/hr) for a particular occupancy schedule or hours in use. (See FIG. 15 for an example of how the psychometric calculations are determined.)

At 420, the psychometric calculation results are summed for the weather ordinates for each energy load type. The results can be summed by month and also annually. Monthly results can be used to produce a monthly energy load breakdown, and annual results can be used to produce an annual energy load breakdown and an energy annual total. (Note that other breakdowns, such as daily or weekly breakdowns can also be provided.) More detailed calculations for the energy monthly load breakdown, the energy annual load breakdown and the energy annual total in the Boston example is provided below with respect to FIG. 7.

At 425, the energy monthly load breakdown, the energy annual load breakdown, and the energy annual total can be divided by a coefficient of performance (COP) to generate the delivered energy monthly breakdown, the delivered energy annual breakdown, and the delivered energy annual total. The COP can be used to include the inefficiencies that occur between energy entering the building and being used as heating/cooling in a room such as boiler or chiller efficiency, pipework losses, etc. In some instances, such as for initial climate energy index calculations, the value of COP can be assumed to be 1 or 100%. The climate energy index can be based on the delivered energy annual total. For the Boston example, a more detailed description of the delivered energy values is provided below with respect to FIG. 7.

At optional 430, from the delivered energy data produced in 425, primary energy data (e.g., a secondary climate carbon index) can be determined based on model carbon data factors (e.g., in the UK gas is quoted as 0.192 kgCO2/kwh and electricity as 0.422 kgCO2/kwh). The primary energy data is representative of the energy required at the source of the energy (e.g., power station) to provide the delivered energy at the location of interest. For the Boston example, a more detailed description of primary energy values is provided below with respect to FIG. 7.

At 435, in addition to delivered energy data and the secondary climate carbon index, other annual secondary data can be provided. Such secondary data can include occupancy, hours outside the desired comfort level or zone, and hours of use for each energy load type, for example.

Figure 6:
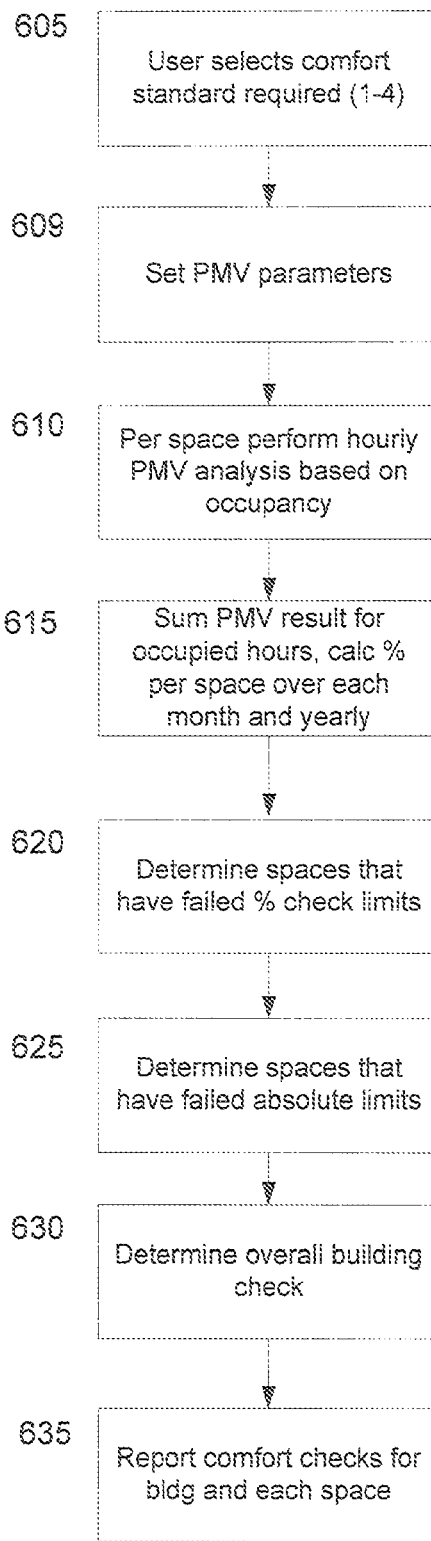
FIG. 6 is a flow diagram for comparing the climate energy index with the building energy index, according to an embodiment.
Figure 10:
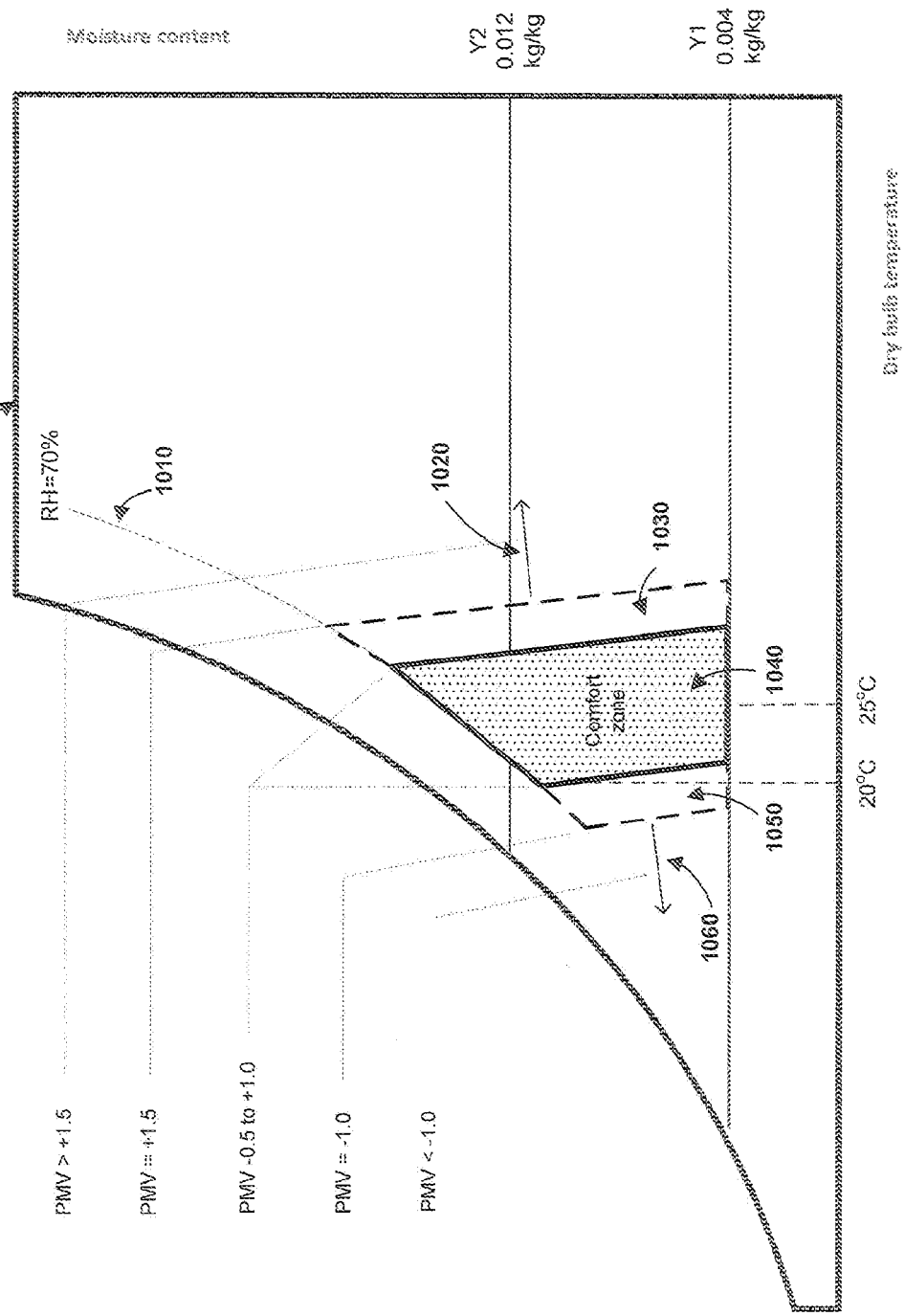
FIG. 10 is a diagram illustrating various comfort check regions in a psychometric chart, according to an embodiment.
Figure 15:
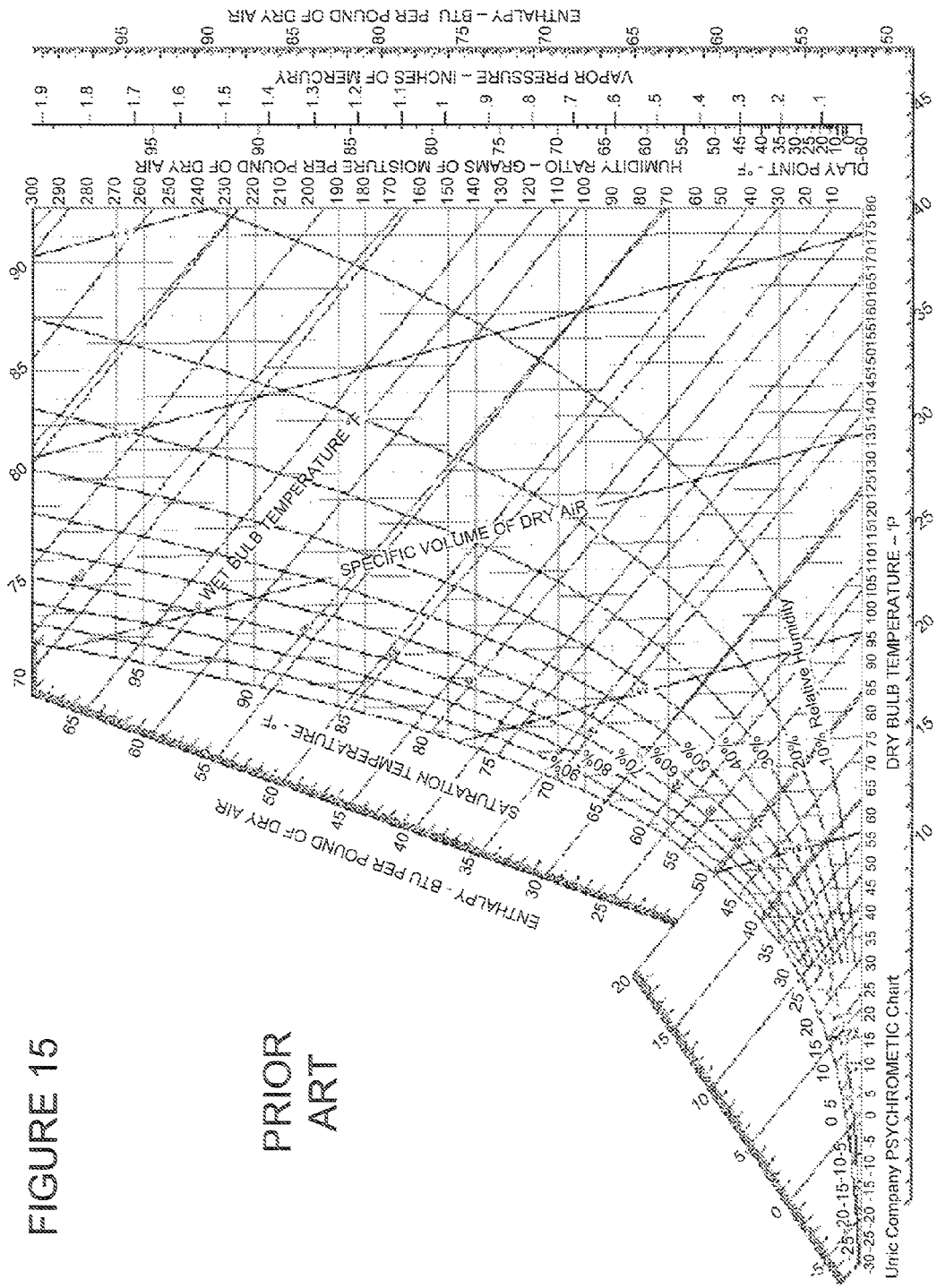
FIG. 15 is an example of how psychometric calculations can be determined, according to one embodiment.

FIG. 6 is a flow diagram for performing a comfort check 321, according to an embodiment. At 605, the user can select a standard that reflects the cultural and economic conditions of the location. At 609, parameters associated with the selected standard that define comfort checks are fixed. For example:

1—Developed country best practice comfort (default)
  PMV −1.00: zero occupied hours below this value
  PMV −0.50: <5% occupied hours below this value
  PMV +1.00: <1% occupied hours above this value
  PMV +1.50: zero occupied hours above this value
2—Developed country basic comfort
  PMV −1.00 zero occupied hours below this value
  PMV +1.00: <1% occupied hours above this value
  PMV +1.50: zero occupied hours above this value
3—Hot climate/developing country hot climate comfort
  PMV −1.00: zero occupied hours below this value
  PMV +1.50: <1% occupied hours above this value
4—Poor country no comfort
No tests or checks In 609, The PMV parameters can be used to define psychometric conditions as shown on FIG. 15. Calculations associated with various spaces or rooms in the building design and the psychrometric conditions can then be defined, as shown in FIG. 10. At 610, for each space or room in the building design, a PMV analysis can be carried out if the space is in occupancy. In one embodiment, the PMV calculation can be carried out according to the formula in FIG. 16, which is the ISO 7730 international standard. At 615, each hourly PMV result is tested against the appropriate selected standard (605) and then each positive hourly result for each test is summed for each month and annually and a percentage (of total occupied hours) is derived. At 620, any spaces in the building design that have failed annual percentage check limits can be reported. At 625, the spaces in the building design that have failed absolute limits can be reported. At 630, individual space PMV check results are summed and the overall building design is checked and it is determined if the building check meets pre-set comfort check markers. For example, when fewer than 5% of spaces by floor area in the building design fail the percentage check limits, the building design may be deemed to have an acceptable level of comfort (e.g., PASS); when between 5% and 10% of spaces by floor area fail the percentage check limits, a design warning may be issued (e.g., WARNING ISSUED); when more than 20% of spaces by floor area fail the percentage check limits, the building design fails (e.g., FAIL); when any of the spaces of the building fail an absolute check, the building design fails (e.g., FAIL). (Note that these pre-set markers can be changed.) At 635, the process 321 can provide a "pass", "warning", or "fail" indication based on the comfort check results. For the Boston example, a more detailed description of the comfort checks is provided below with respect to FIG. 10.

Figure 7:
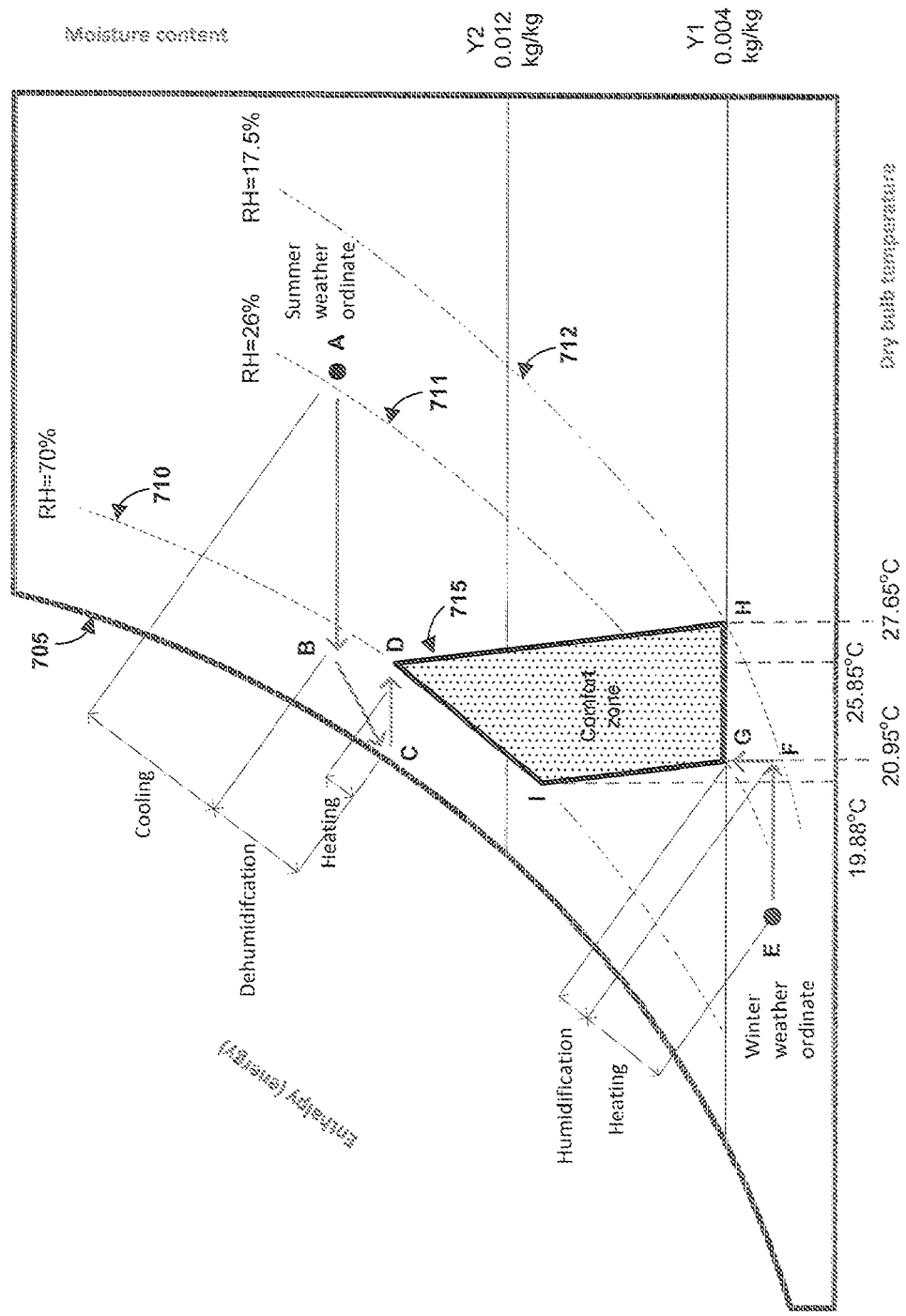
FIG. 7 is a diagram illustrating example calculations of the climate energy index using a psychometric chart, according to an embodiment.

FIG. 7 illustrates examples of calculations of the climate energy index and the PMV checks implemented using a psychometric chart 705 for the city of Boston, according to an embodiment. The climate energy index can be determined from a weather data file (e.g., a standard weather file). Each weather file ordinate (e.g., hourly reading or data point) is analyzed to determine the energy that is required to move the ordinate to the nearest boundary of a comfort zone 715. The method typically operates on a unitary air flow. The boundaries of the comfort zone 715 are determined such that the comfort zone 715 meets a specified target comfort level that provides a reasonable representation of good human comfort on a global scale. The boundaries of the comfort zone 715 can be defined using, for example, the PMV formula on FIG. 16 (e.g., set out in ISO 7730). Other PMV boundaries can also be used, for example, with the following parameters: PMV (predicted mean vote) of −0.5 to ±1.0; MC=0.004 kg of moisture/kg of air (kg/kg); RH=70%; Tr (radiant temperature in degrees Celsius)=Ta (air temperature in degrees Celsius): CLO (clothing insulation)=1.0 (for a nominal office work clothing while seated); MET (metabolic rate)=1.1 (for a nominal office work rate); and 0.1 m/s (air velocity).

In the examples illustrated in FIG. 7, the boundaries of the comfort zone 715 are represented by boundary points I, D, G, and H. Point I corresponds to a coordinate in chart 705 having a dry bulb temperature of 19.88° C. and 70% relative humidity. Point D corresponds to a coordinate in chart 705 having a dry bulb temperature of 25.85° C. and 70% relative humidity. Point G corresponds to a coordinate in chart 705 having a dry bulb temperature of 20.95° C. and 26% relative humidity. Point H corresponds to a coordinate in chart 705 having a dry bulb temperature of 27.65° C. and 17.5% relative humidity.

Chart 705 also shows line 710, which corresponds to a portion of a constant 70% relative humidity line in the chart. Line 710 can be used to define the upper portion of the comfort zone 715, which includes points D and I. The vertical coordinates Y1=0.004 kg/kg and Y2=0.012 kg/kg represent moisture content (MC) (i.e., weight of water per weight of dry air) at two different positions in chart 705. Y1 defines the bottom boundary or the comfort zone GH. Y2 can be helpful as it is used in ASHRAE standards.

In a first example illustrated in FIG. 7, the weather data file can include a summer weather ordinate indicated by a point A in chart 705. The position of the summer weather ordinate in chart 705 is based on the weather variables associated with the summer weather ordinate. In this example, the weather variables associated with point A can be dry bulb 35° C. and wet bulb=26° C. (RH=48%, MC=0.0176 kg/kg).

To determine the amount of energy required to move from point A to the nearest boundary in the comfort zone 715, various steps can be taken. A first step can be to move from point A to point B. Such a move requires a certain amount of sensible cooling to take place. A next step can be to move from point B to point C, which requires a certain amount of cooling and dehumidification. A last step can be to move from point C to point D on the boundary of the comfort zone 715. Such a move requires a certain amount of sensible heating. Each of the exemplary steps shown in this example to move point A to point D requires a different type of energy load type.

For each step of the above-described example, that is, for each energy load type, the hourly process energy is calculated. In this example, the amount of sensible cooling required to move from point A to point B is 0.0039 Kwh per (m$^3$/hr). (This can be determined using a standard psychometric calculation) The amount of cooling and dehumidification required to move from point B to point C is 0.066 Kwh per (m$^3$/hr). (This can also be determined using the standard psychometric calculation.) The amount of sensible heating required to move from point C to the boundary of the comfort zone 715 at point D is 0.0009 Kwh per (m$^3$/hr). (This can also be determined using the standard psychometric calculation.) In this example, no energy was required for humidification given the sufficiently humid conditions associated with the weather variable. (This was also determined using the standard psychometric calculation.)

Once the amount of energy required for each energy load type is determined for a particular weather file hourly ordinate, a similar calculation can be performed on the remaining weather file hourly ordinates of the weather data file. For an annual weather data file having hourly ordinates, a total of 8760 calculations can be performed. The totals for each energy load type can be added and then divided by a coefficient of performance as described above with respect to FIG. 4. In this example, the annual total for sensible cooling can be 30.15 Kwh/yr per (m$^3$/hr), for humidification can be 52.47 Kwh/yr per (m$^3$/hr), for sensible heating can be 7.52 Kwh/yr per (m$^3$/hr), and for humidification can be 0.00 Kwh/yr per (m$^3$/hr). (These can be determined using the standard psychometric calculation.) The climate energy index (singular) can be obtained by adding the annual totals for all the energy load types, which in this example is 90.15 Kwh/yr per (m$^3$/hr). Such a result can be rounded off to 90, for example, to make the climate energy index a more convenient and easy to use metric.

The primary energy annual total can be determined from the climate energy index. In this example, the primary energy annual total can be 51.11 kgCO2/yr per (m$^3$/hr). This can be derived by multiplying the climate energy index by an appropriate local carbon factor. This can also be derived by obtaining the annual totals for each different energy type (e.g., electrical for cooling and dehumidification, gas for heating and humidification), then multiplying each energy type by an appropriate local carbon factor, and adding all of the energy types (with the appropriate local carbon factor multiplied in) together.

In a second example illustrated in FIG. 7, the weather data file can include a winter weather ordinate indicated by point E in chart 705. The position of the winter weather ordinate in chart 705 is based on the weather variables associated with the winter weather ordinate. As described above, to determine the amount of energy required to move from point E to the nearest boundary in the comfort zone 715, one or more steps may be needed. A first step can be to move from point E to point F. Such a move requires a certain amount of sensible heating to take place. A next step can be to move from point F to point G on the boundary of the comfort zone 715. Such a move requires a certain amount of humidification. A similar calculation can be performed as described above with respect to the summer weather ordinate in point A to determine the energy breakdown by energy load type for the winter weather ordinate in point E.

Figure 8:
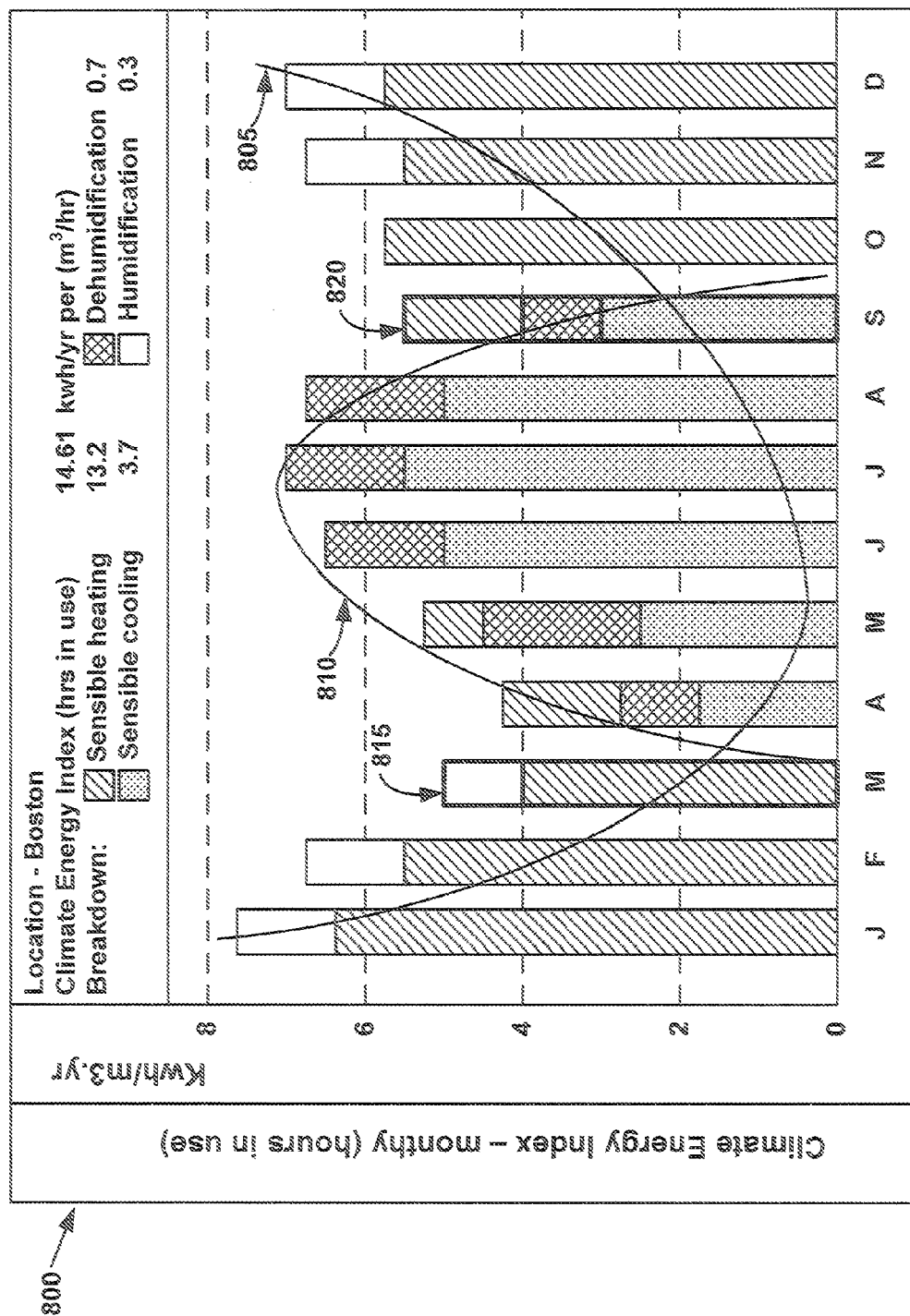
FIG. 8 is a diagram providing examples of a climate energy index output with detailed monthly breakdown by energy load type for a particular location and a given weather data file, according to an embodiment.

FIG. 8 shows a bar chart 800 that provides an example of a detailed monthly breakdown by energy load type for a particular location and a given weather data file. In this example, with Boston being the location of interest the climate energy index can be calculated based on hours of use and the total sum or metric determined to be 14.61 Kwh/yr per (m$^3$/hr). Annual breakdowns for each energy load type are also shown: sensible heating is 13.2 Kwh/yr per (m$^3$/hr), sensible cooling is 3.7 Kwh/yr per (m$^3$/hr), and dehumidification is 0/7 Kwh/yr per (m$^3$/hr), and humidification is 0.3 Kwh/yr per (m$^3$/hr).

Each column in the chart 800 corresponds to a particular month of the year and includes data associated with the energy load types used in that particular month. For each column, information associated with sensible heating is shown in hashed lines, information associated with sensible cooling is shown in small dots, information associated with dehumidification is shown in cross-hatch, and information associated with humidification is shown in solid white. For example, column 815 in chart 800 corresponds to the month of March in the city of Boston and illustrates the need for sensible heating and humidification in Boston in March. In another example, column 820 in chart 800 corresponds to the month of September and illustrates the need for both sensible cooling and sensible heating as well as dehumidification during September in Boston. The curved lines 805 and 810 in chart 800 are trend lines for the monthly energy totals. They can assist users in quickly understanding the basic pattern of the heating and cooling loads. Trendlines 805 and 810 can be calculated using a standard non-linear regression analysis. The chart 800 can be an output produced by, for example, the climate energy index module 175.

Figure 9:
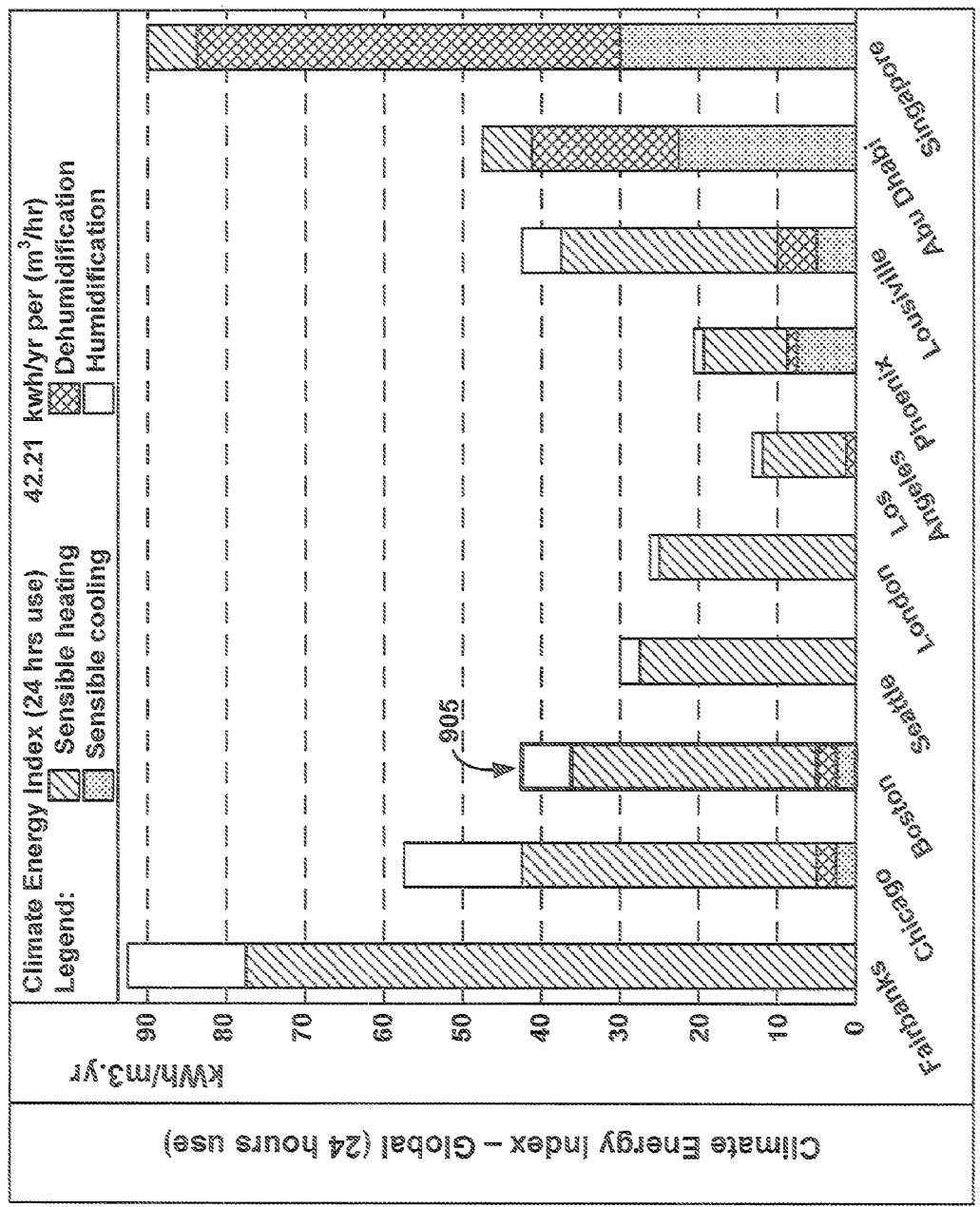
FIG. 9 is a diagram providing examples of worldwide climate energy index change perspective with a detailed breakdown by energy load type for various locations, according to an embodiment.

FIG. 9 shows a chart 900 that provides an example of worldwide climate perspective with a breakdown by energy load, type for various locations. In this example, Boston can be chosen as a reference location having a climate energy index calculated based on 24-hours of use and determined to be 42.21 Kwh/yr per (m$^3$/hr). Bar 905 in bar chart 900 corresponds to Boston and illustrates the need for a small amount of sensible cooling, a small amount of dehumidification, some humidification, but mostly sensible heating. Bar 905 can be compared with other bars in chart 900 to compare total climate energy index or in more detail sensible heating, sensible cooling, dehumidification, or humidification between various locations.

The climate energy index and energy load type breakdowns vary significantly by location, from cold and dry conditions in Fairbanks, Ak., which requires both sensible heating and humidification, to hot and humid conditions in Singapore, which requires sensible cooling, dehumidification, and some sensible heating. As shown in FIG. 9, the weather conditions in Los Angeles are such that that city requires the least amount of energy to achieve the desired level of comfort from among the various cities included. The bar chart 900 can be an output produced by, for example, the climate energy index 175.

FIG. 10 shows a chart 1000 illustrating how a number of comfort checks are performed on any simulated and/or measured results prior to comparison with the building energy index.

For example, in the Boston example, the user has selected the Developed country basic standard; the results from the model simulation are then assessed on a space by space basis during occupied hours only. For a typical space there are zero hours below PMV −1.00, so this passes There are 2% hours above PMV +1.00, so this fails and there are zero hours above PMV +1.50, so this passes. Repeating these tests on every occupied space finds 6% of all spaces failing the PMV +1.00 check—as this amount (6%) is between 5% and 10%, so a warning is issued. When the results pass the comfort checks, the simulated or measured results can be fairly compared to the building energy index.

Chart 1005 of FIG. 10 illustrates various regions associated with the different predicted mean vote (PMV) conditions used in performing comfort checks for each normally and regularly occupied hour in each space of the building. In the actual building results, these test boundaries shift in terms of Ta and Tr because PMV is a product of Ta and Tr; this rewards good designs (better Tr) with a wider range of acceptable Ta conditions.

For example, region 1060 can correspond to a condition in which PMV<−1.0. Region 1050 can correspond to a condition in which −1<PMV<−0.5 and RH<70% and MC>0.004. Region 1040 can correspond to a condition in which −0.5<PMV<+1.0 and RH<70% and MC>0.004. Region 1030 can correspond to a satisfactory comfort condition in which +1.0 PMV<+1.5 and RH<70% and MC>0.004. Region 1020 can correspond to a condition in which PMV>−1.5.

The comfort tests vary depending on the user selected standard. The checks can assume the same CLO, MET, and air velocity values that are used for the climate energy index or utilize actual building values. An overall check of the building level can also be carried out to provide a realistic and practical level of tolerance. This process is described in more detail above at 630 in FIG. 6. In this example, the building design can be such that 6% of spaces fail. In this instance, a warning can be issued but the results pass comfort checks such that the building energy index and the climate energy index can be compared.

Figure 11:
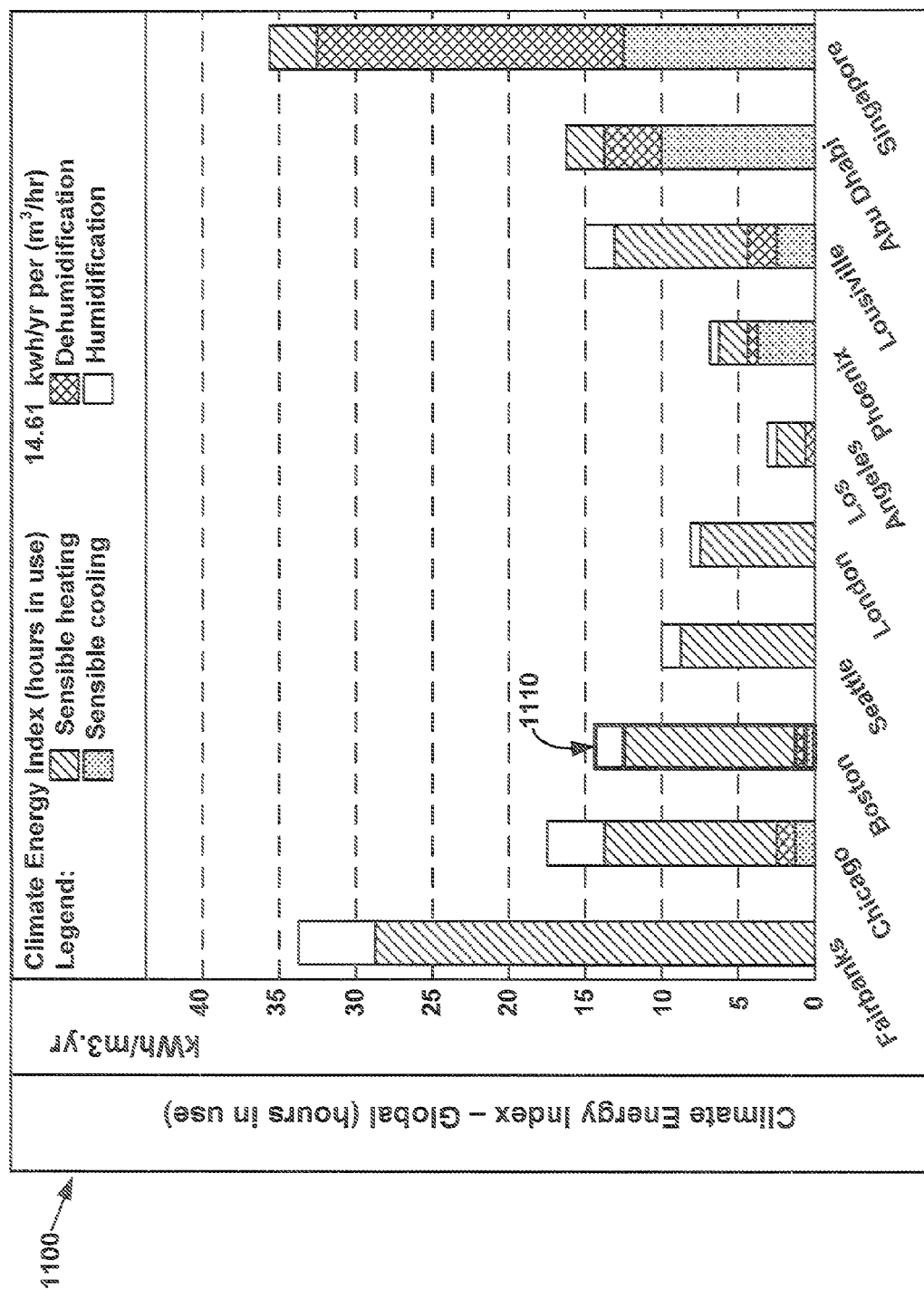
FIG. 11 is a diagram providing examples of worldwide climate energy index change perspective with a detailed breakdown by energy load type for various locations, according to an embodiment.

FIG. 11 shows a chart 1100 that provides examples of worldwide climate energy index variations with a detailed breakdown by energy load type, according to an embodiment. The chart 1100 includes climate energy indices for a global basket of city climates, ranging from Fairbanks, Ak., to Singapore, which can be used as points of reference. Bar 1110 in chart 1100 corresponds to the city of Boston, the location in question. For an analysis based on hours of use, the climate energy index for Boston can be 14.61 Kwh/yr per (m$^3$/hr). Note that FIG. 9 shows the climate energy index for Boston to be 42.21 Kwh/yr per (m$^3$/hr) when 24-hour use is considered. For the global basket of city climates shown in FIG. 11, extreme climates have the largest climate energy indices. For example, for Fairbanks, Ak., which has an extremely cold climate, the climate energy index can be about 34.5 Kwh/yr per (m$^3$/hr). For Singapore, which has an extreme hot climate, the climate energy index can be about 35.4 Kwh/yr per (m$^3$/hr). For Los Angeles, however, which has a benign climate (e.g., arm marine or humid temperate), the climate energy index is 3.5 Kwh/yr per (m$^3$/hr). Thus, in this example, the climate energy index for Boston is about 40% of the climate energy index for Singapore and about 420% of the climate energy index for Los Angeles.

Figure 12:
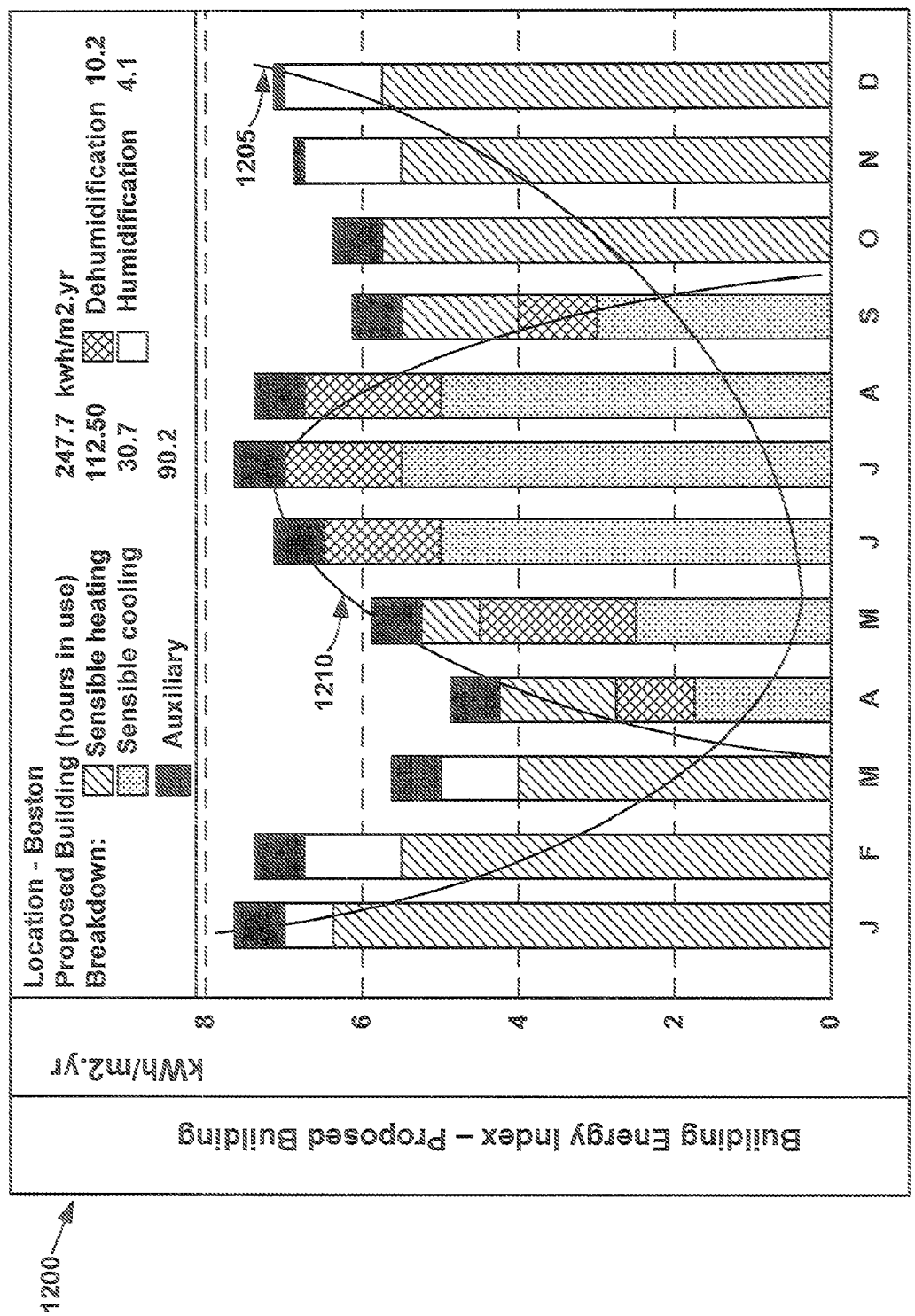
FIG. 12 is a diagram providing examples of a building energy index output with detailed monthly breakdown by energy load type for a particular location and a given weather data file, according to an embodiment.

FIG. 12 shows a bar chart 1200 that provides an example of a building energy index output for a proposed building, including a detailed monthly breakdown by energy load type (e.g., psychometric loads plus auxiliary loads), according to an embodiment. In this example the building energy use can result in a building energy index of about 247.7 kwh/m2·yr for a building located in Boston. As described earlier, the building energy index can include psychometric loads (sub-total 157.5 kwh/m2·yr) of sensible heating component of about 112.3 kwh/m2·yr, a sensible cooling component of about 30.5 kwh/m2·yr, a dehumidification component of about 10.4 kwh/m2·yr, and a humidification component of about 4.4 kwh/m2·yr, plus auxiliary loads (sub-total 90.2 kwh/m2·yr) of hot water 6 kwh/m2·yr (thermal), process 0 kwh/m2·yr (thermal), lighting 22 kwh/m2·yr, plug 33 kwh/m2·yr, process 19 kwh/m2·yr (electrical) and plant 2 kwh/m2·yr.

Comparing the building energy index of 247.7 kwh/m2·yr to the actual building energy use of 302.5 kwh/m2·yr shows that that the building is 22% higher than that of the building energy index for that location. The comparison of the simulated or measured energy use to the building energy index can be a valid comparison when the building design has passed the comfort zone tolerance checks described above with respect to FIGS. 6 and 10. Chart 1200 includes trendlines 1205 and 1210 that indicate the annual trend for heating and cooling energy respectively. Trendlines 1205 and 1210 can be calculated using a standard non-linear regression analysis.

Figure 17:
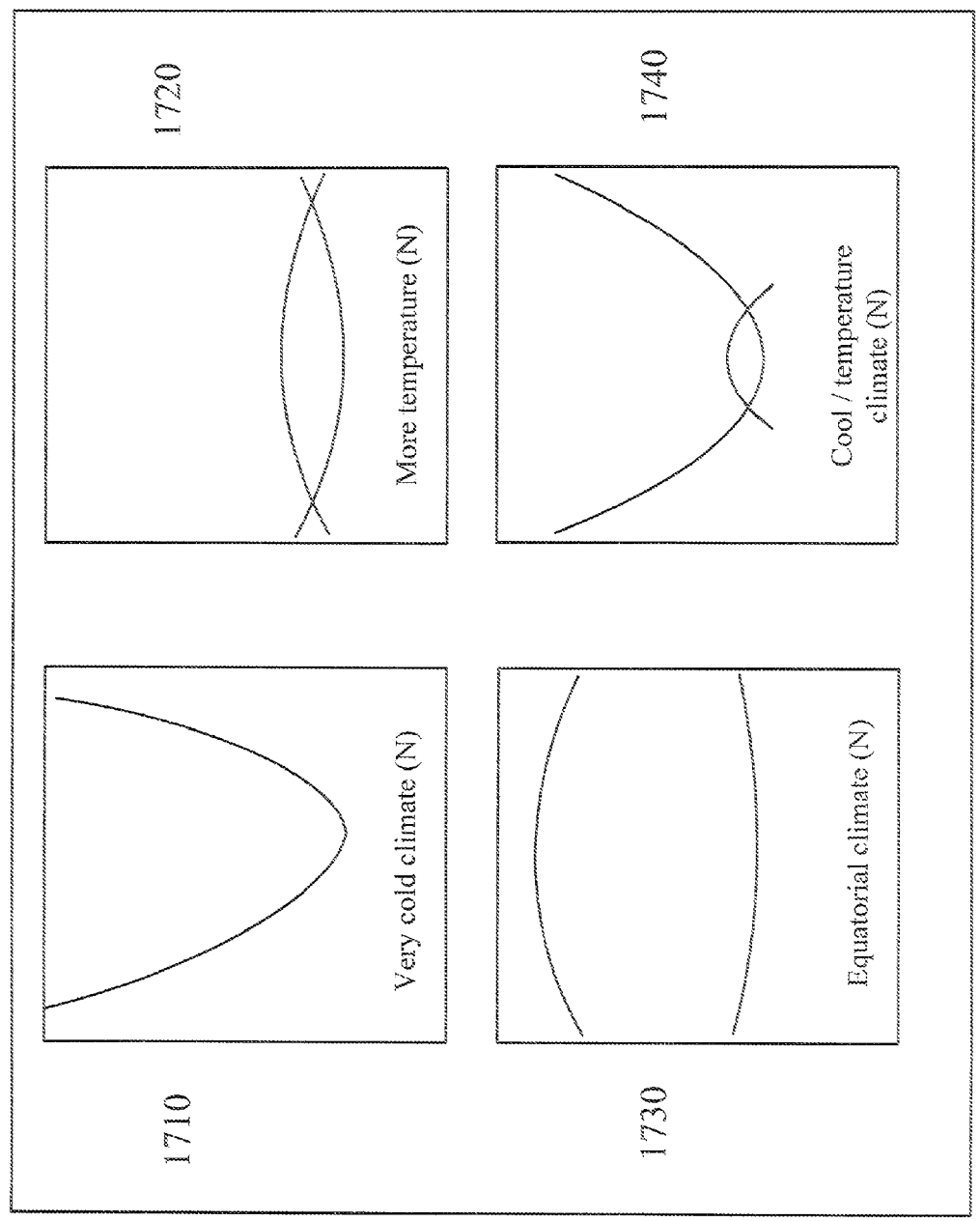
FIG. 17 is a chart containing examples of trend lines that could be produced from, for example, FIG. 8 or FIG. 9, for a range of locations, according to an embodiment.

FIG. 17 illustrates a chart 1700 containing examples of trendlines that could be produced from, for example, FIG. 8 or FIG. 9, for a range of locations, according to an embodiment. Visual inspection of the shape of these trendlines and the pattern they form in combination communicates the nature of a climate. Example 1710 can show a very cold climate—the heating trendline is steep, the quanta high and the cooling trend is zero. Example 1720 can show a benign climate—both heating and cooling trendlines are shallow and the quanta low. Example 1730 can show a hot humid equatorial climate—both trendlines are shallow, cooling quanta is high and heating quanta low. Example 1740 can show a cool temperate climate—the cooling line is short with a low quanta, the heating steeper with higher quanta. A similar visual inspection can be applied to trendlines produced by building energy index charts, such as, for example, FIG. 12. In this instance the trendlines communicate the nature of the building. For example, where the cooling trendline is longer and the quanta higher than the heating trendline, the building is dominated by cooling. By comparing the simulated or measured results with the appropriate BEI chart, it can be seen how, for example, which load elements of the design are an improvement or otherwise over the building energy index benchmark. For example, if there is a greater cooling load than the building energy index, building shading can be improved. Such visual analysis informs design understanding and strategy decision making.

Figure 5:
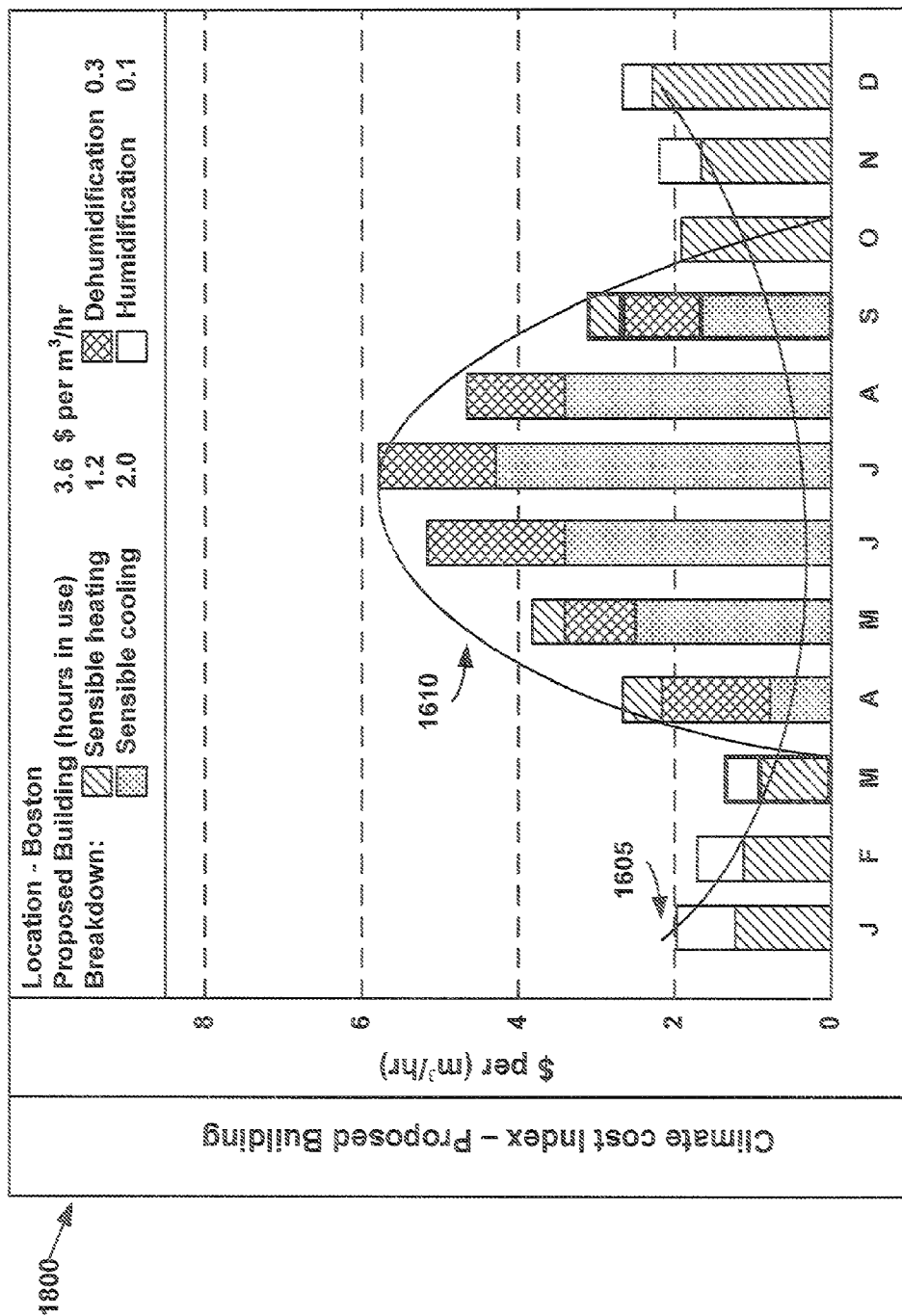
FIG. 5 illustrates an additional variant graph that can be produced of this type—based on energy costs, local rates, and tariffs, according to one embodiment.
Figure 13:
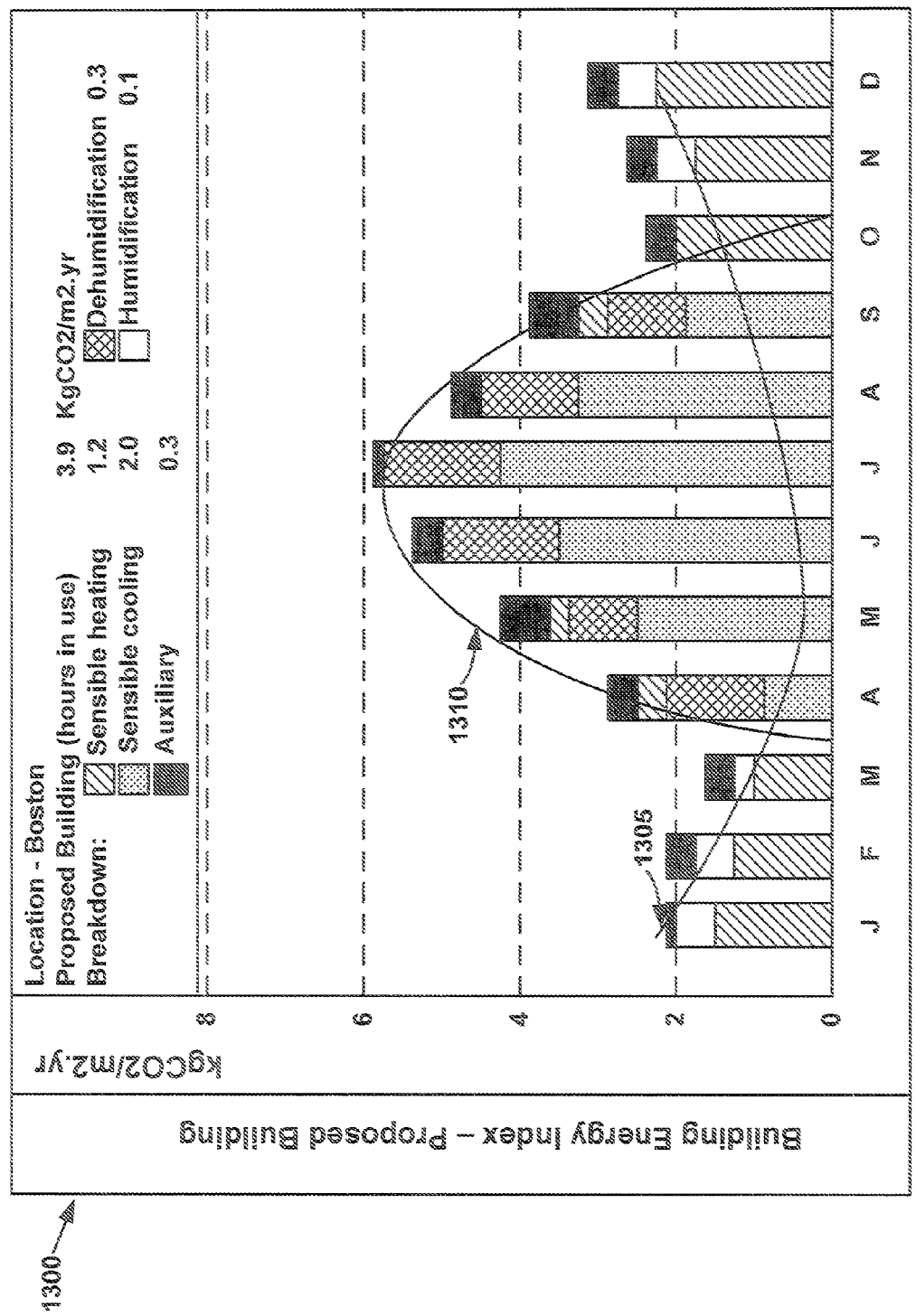
FIG. 13 is a diagram providing examples of primary energy information for a building design (e.g., proposed or built), according to an embodiment.

FIG. 13 shows a bar chart 1300 that provides examples of primary energy information for the simulated or measured building design of FIG. 12, according to an embodiment. In this example, the primary energy data for the proposed building designed can be determined to be about 3.9 KgCO2/m2·yr. The primary energy data can include a sensible heating component of about 1.2 KgCO2/yr, a sensible cooling component of about 2.0 KgCO2/yr, a dehumidification component of about 0.3 KgCO2/yr, a humidification component of about 0.1 KgCO2/yr, and auxiliary loads of 0.3 kgCO2/yr. Curved lines 1305 and 1310 represent trendlines, as described above. One reason for showing primary energy as well as delivered energy is that local carbon factors demonstrably alter the shape of these charts and thus tell both parts of a story depending one whether a user is concerned about cost (energy use) or $CO_2$ emissions (primary energy). For example, 1310 clearly shows cooling (2.0+0.3) dominates carbon emissions whereas in 1200 heating is the larger energy demand (5.50+0.2). Depending on the user's priorities, one may take a different strategy because of 1200 and 1300. It should be noted that an additional variant graph (FIG. 5) can be produced of this type—based on energy costs, local rates, and tariffs.

Figure 14:
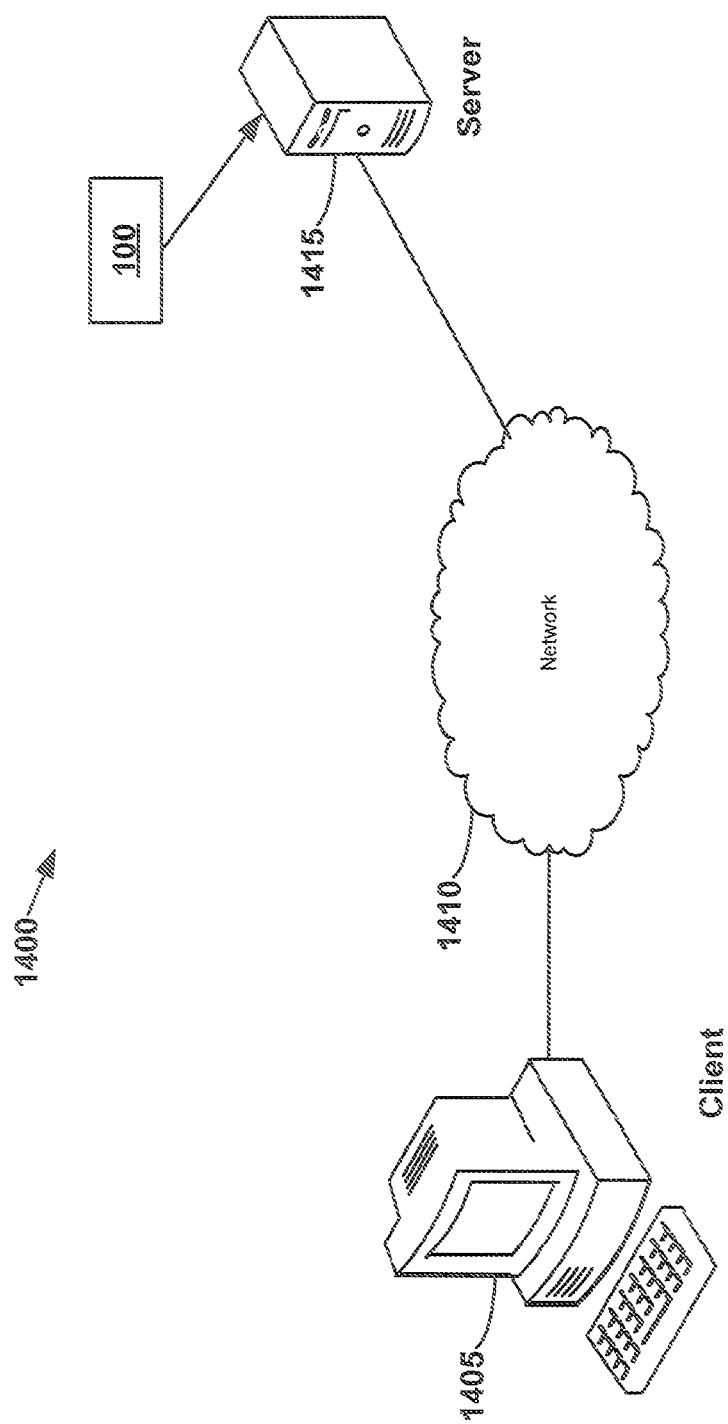
FIG. 14 is a system for integrated analysis and design, according to an embodiment.

FIG. 14 shows a system 1400 that can include a client 1405, a network 1410, and a server 1415. The client 1405 and the server 1415 can be configured to communicate with each other via the network 1410. The network 1410 can be a local area network (LAN), a wide area network (WAN), or other type of network architecture having a larger geographic scope than that of a LAN or WAN. In some embodiments, the network 1410 can include portions configured for wireless communication.

The server 1415 can be configured to interact with the integrated analysis and design environment 100 and/or perform functions associated with the integrated analysis and design environment 100. In some embodiments, at least a portion of the integrated analysis and design environment 100 can be integrated into the server 1415. Such integration can be done via hardware, software, or both. The client 1405 can be configured to allow a use to interact with the at least some of the functionality of the integrated analysis and design environment 100. The client 1405 can be used to display outputs produced by the integrated analysis and design environment 100.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages, are presented for example purposes only. The disclosed methodology and system are each sufficiently flexible and configurable, such that it may be utilized in ways other than that shown. For example, the steps listed in any flowchart may be re-ordered or only optionally used (even when not explicitly indicated) in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computerized method for optimizing a building design, comprising:
   identifying, using at least one application coupled to at least one computer, at least one geographic location;
   identifying, using the at least one application, at least one human comfort zone;
   for weather ordinates associated with the at least one geographic location, performing processing associated with calculating, using the at least one application, an indication of the amount of energy required to bring an outside air point to the boundary of the defined comfort zone for each energy load type that can be used to reach the comfort zone;
   for each energy load type, performing processing associated with summing, using the at least one application, the indication for at least one time period and dividing the total by a coefficient of performance to give an energy calculation;
   performing processing associated with summing, using the at least one application, all the energy calculations to produce at least one first index value associated with delivered energy;
   performing processing associated with determining, using the at least one application, at least one building air change factor for at least one building design;
   performing processing associated with determining, using the at least one application, the floor area of the building design;
   performing processing associated with multiplying, using the at least one application, the first index value by the air change factor and dividing by the floor area to give an intermediate value;
   performing processing associated with determining, using the at least one application, auxiliary load benchmark data for the at least one building design;

performing processing associated with determining, using the at least one application, occupancy hours of the at least one building design;

performing processing associated with normalizing, using the at least one application, the auxiliary load benchmark data for the occupancy hours of the at least one building design;

performing processing associated with adding, using the at least one application, the normalized auxiliary load benchmark data to the intermediate value to calculate at least one second index value;

performing processing associated with determining, using the at least one application, simulated delivered energy data;

performing processing associated with determining, using the at least one application, whether to adjust the at least one building design based on the building simulated delivered energy data and whether the at least one building design meets pre-determined comfort conditions;

performing processing associated with comparing, using the at least one application, the comfort checked building simulated delivered energy data with the at least one second index value, broken down into energy load types, to determine which load elements of the design are an improvement or otherwise over the index value benchmark; and performing processing associated with making adjustments, using the at least one application, based on the comparison to optimize the building design.

2. The method of claim 1, wherein the at least one time period comprises:
a year; and/or
at least one occupancy schedule representative of the use of a building.

3. The method of claim 1, wherein the at least one energy calculation comprises:
at least one heating energy calculation;
at least one cooling energy calculation;
at least one humidification energy calculation; and
at least one dehumidification energy calculation.

4. The method of claim 1, wherein the comfort zone criteria is based upon values associated with:
occupant comfort values; or
different comfort zones;
the different comfort zones being determined by:
at least two geographic locations; or
cultural and/or economic differences; or
any combination thereof.

5. The method of claim 1, wherein the at least one energy calculation comprises:
one or more sources of energy including:
fossil fuel energy; and/or
renewable energy.

6. The method of claim 1, wherein the at least one weather file ordinate associated with the at least one geographic location comprises any weather variable data.

7. The method of claim 2, wherein:
the at least one occupancy schedule includes data associated with occupancy and/or activities for a building in the at least one geographic location at various times of the day, on different days, or both.

8. The method of claim 1, further comprising:
performing processing associated with producing, using the at least one application, at least one monthly energy load breakdown, or at least one annual energy load breakdown, or both, for the at least one geographic location; and performing processing associated with determining, using the at least one application, at least one delivered energy monthly breakdown from the at least one monthly energy load breakdown, or at least one delivered energy annual breakdown from the at least one annual energy load breakdown, or both.

9. The method of claim 4, further comprising:
performing processing associated with determining, using the at least one application, different comfort zones depending on at least two geographic locations.

10. A system for optimizing a building design comprising:
at least one server and/or at least one client coupled to a network;
at least one application coupled to the at least one server and/or the at least one client, the at least one application configured to perform processing associated with:
identifying at least one geographic location;
identifying at least one human comfort zone;
for weather ordinates associated with the at least one geographic location, calculating an indication of the amount of energy required to bring an outside air point to the boundary of the defined comfort zone for each energy load type that can be used to reach the comfort zone;
for each energy load type, summing the indication for at least one time period and dividing the total by a coefficient of performance to give an energy calculation;
summing all the energy calculations to produce at least one first index value associated with delivered energy;
determining at least one building air change factor for at least one building design;
determining the floor area of the building design;
multiplying the first index value by the air change factor and dividing by the floor area to give an intermediate value;
determining auxiliary load benchmark data for the at least one building design;
determining occupancy hours of the at least one building design;
normalizing the auxiliary load benchmark data for the occupancy hours of the at least one building design;
adding the normalized auxiliary load benchmark data to the intermediate value to calculate at least one second index value;
determining, using the at least one application, simulated delivered energy data;
determining, using the at least one application, whether to adjust the at least one building design based on the building simulated delivered energy data and whether the at least one building design meets pre-determined comfort conditions;
comparing the comfort checked building simulated delivered energy data with the at least one second index value, broken down into energy load types, to determine which load elements of the design are an improvement or otherwise over the index value benchmark; and
making adjustments based on the comparison to optimize the building design.

11. The system of claim 10, wherein the at least one time period comprises:
   a year; and/or
   at least one occupancy schedule representative of the use of a building.

12. The system of claim 10, wherein the at least one energy calculation comprises:
   at least one heating energy calculation;
   at least one cooling energy calculation;
   at least one humidification energy calculation; and
   at least one dehumidification energy calculation.

13. The system of claim 10, wherein the comfort zone criteria is based upon values associated with:
   occupant comfort values; or
   different comfort zones;
   the different comfort zones being determined by:
   at least two geographic locations; or
   cultural and/or economic differences; or
   any combination thereof.

14. The system of claim 10, wherein the at least one energy calculation comprises:
   one or more sources of energy including:
      fossil fuel energy; and/or
      renewable energy.

15. The system of claim 10, wherein the at least one weather file ordinate associated with the at least one geographic location comprises any weather variable data.

16. The system of claim 11, wherein:
   the at least one occupancy schedule includes data associated with occupancy and/or activities for a building in the at least one geographic location at various times of the day, on different days, or both.

17. The system of claim 10, wherein the at least one application is further configured to perform processing associated with:
   producing at least one monthly energy load breakdown, or at least one annual energy load breakdown, or both, for the at least one geographic location; and
   determining at least one delivered energy monthly breakdown from the at least one monthly energy load breakdown, or at least one delivered energy annual breakdown from the at least one annual energy load breakdown, or both.

18. The system of claim 13, wherein the at least one application is further configured to perform processing associated with:
   determining different comfort zones depending on at least two geographic locations.

* * * * *